US007155419B2

(12) United States Patent
Blackman et al.

(10) Patent No.: US 7,155,419 B2
(45) Date of Patent: Dec. 26, 2006

(54) AGREEMENT MANAGEMENT SYSTEM AND METHOD

(75) Inventors: Robert Sage Blackman, Nevada City, CA (US); Stephen G. Weinstein, Oakland, CA (US)

(73) Assignee: AgreeNet, Redwood City, CA (US)

( * ) Notice: Subject to any disclaimer, the term of this patent is extended or adjusted under 35 U.S.C. 154(b) by 864 days.

(21) Appl. No.: 09/839,587

(22) Filed: Apr. 20, 2001

(65) Prior Publication Data
US 2002/0087534 A1 Jul. 4, 2002

Related U.S. Application Data

(60) Provisional application No. 60/198,731, filed on Apr. 20, 2000, provisional application No. 60/209,866, filed on Jun. 7, 2000.

(51) Int. Cl.
*G06Q 99/00* (2006.01)
(52) U.S. Cl. .............................. 705/80; 707/4; 707/10; 709/230
(58) Field of Classification Search ................ 707/1–4, 707/102, 201, 8, 9, 10, 104.1, 101; 705/26, 705/30, 40, 51, 54, 80, 64, 1, 37, 38, 39; 709/217, 223, 224, 225, 229, 208, 222, 227, 709/203–232; 710/15; 713/156, 166, 167, 713/168, 201
See application file for complete search history.

(56) References Cited

U.S. PATENT DOCUMENTS

| 5,220,501 | A | * | 6/1993 | Lawlor et al. ................. 705/40 |
| 5,325,527 | A | * | 6/1994 | Cwikowski et al. ........ 709/222 |
| 5,465,206 | A | * | 11/1995 | Hilt et al. ...................... 705/40 |
| 5,495,412 | A | * | 2/1996 | Thiessen ........................ 705/1 |
| 5,535,383 | A | * | 7/1996 | Gower ..................... 707/103 R |
| 5,611,052 | A | * | 3/1997 | Dykstra et al. ................. 705/38 |
| 5,692,206 | A | * | 11/1997 | Shirley et al. ............... 715/531 |
| 5,704,045 | A | * | 12/1997 | King et al. .................... 705/35 |
| 5,907,829 | A | * | 5/1999 | Kida .............................. 705/9 |

(Continued)

FOREIGN PATENT DOCUMENTS

WO    WO 97/04410    * 2/1997

OTHER PUBLICATIONS

Tao Zhao et al., Expressing and Enforcing Distributed Resource Sharing Agreement, May 2000, IEEE, pp. 1-11.*

*Primary Examiner*—Jeffrey Gaffin
*Assistant Examiner*—Jacques Veillard
(74) *Attorney, Agent, or Firm*—Morgan, Lewis & Bockius LLP

(57) ABSTRACT

An agreement management system for organizing information around agreements and chains of agreements. The system includes an agreement database and notes database for storing agreements and information directly related to those agreements. The system further includes a set of forms for use in negotiating an agreement, modifying an existing agreement and managing the performance of an existing agreement. The system supports agreement chains which permit the linking of pairs of agreements such that the customer of one of the linked agreements is a supplier to a customer of another of the linked agreements. Templates that permit the simple reuse of agreement chains are also supported by the system. A number of ancillary databases, such as a contacts database, a correspondence database, a folders database, a reminders database and a notebook database give the system the flexibility to record additional information both related to the agreements and unrelated to the agreements.

41 Claims, 21 Drawing Sheets

U.S. PATENT DOCUMENTS

| | | | |
|---|---|---|---|
| 5,991,829 A * | 11/1999 | Giorgio et al. | 710/15 |
| 6,049,784 A * | 4/2000 | Weatherly et al. | 705/38 |
| 6,059,784 A * | 5/2000 | Perusek | 606/54 |
| 6,078,906 A * | 6/2000 | Huberman | 705/37 |
| 6,161,121 A * | 12/2000 | Hardy et al. | 718/104 |
| 6,327,613 B1 * | 12/2001 | Goshey et al. | 709/208 |
| 6,351,739 B1 * | 2/2002 | Egendorf | 705/40 |
| 6,714,979 B1 * | 3/2004 | Brandt et al. | 709/225 |
| 6,829,595 B1 * | 12/2004 | Justice | 705/64 |
| 6,839,687 B1 * | 1/2005 | Dent et al. | 705/40 |
| 7,007,227 B1 * | 2/2006 | Constantino et al. | 715/500 |
| 2004/0103205 A1 * | 5/2004 | Larson et al. | 709/229 |

* cited by examiner

NEW REQUEST / NEW PROPOSAL FORM

A completed NEW REQUEST form is shown below.

FIG. 9B

THE URGENTS VIEW — 282

280 — Good Morning Bob, these items require your immediate attention:

| STATUS | CONTACT | DELIVERABLE | FOLDER |
|---|---|---|---|
| Request | Celeste Baron | 401K Revision | Unfiled Agreements |
| Request | Celeste Baron | Contribution To Employee Newsletter | Unfiled Agreements |
| Request | Steve Weinstein | Review Of Patent Law Firms | Unfiled Agreements |
| Proposal | Murrali Rangarajan | Requirements For AMS Design | Unfiled Agreements |
| Clarify? | Steve Weinstein | 10% Raise | Unfiled Agreements |
| Counter | Steve Weinstein | Status Of AMS Specs | Unfiled Agreements |
| On Hold | Raj Muni | Review Of Annual Budget | Unfiled Agreements |

288 GO

EXIT

296

284

286

292 — Field or variable does not exist:

FIG. 10

THE REVIEW FORM

| | | | |
|---|---|---|---|
| | Request From Celeste Baron For Contribution To Employee Newsletter | | 304 |
| ACCEPT | TRANSMISSION TYPE | *Request From Celeste* | TRANSMISSION DATE & TIME |
| 326 — OK! | CUSTOMER | Celeste Baron | 02/01/00 Tue. 7:48 am |
| | SUPPLIER | You | RESPONSE TIME / STATE — 300 |
| UNCLEAR | DELIVERABLE | Contribution To Employee Newsletter | N/A 306 1/1 |
| 332 — ? | SPECIFICATIONS | Submit your article on the employee track and field day in a MS Word file. It should be about 300 words in length. | ELEMENTS OF SATISFACTION Return Phone Calls Promptly / Complete On Time — 302 |
| HOLD 328 | DUE DATE/TIME | 02/01/00 Tuesday 3:00 pm | 308 |
| DECLINE 330 — X | MESSAGE | Bob, thanks for your help on this. | |
| | FOLDER | Unfiled Agreements | CORRESPONDENCE / NEGOTIATIONS |
| | CC LIST | None — 310 | 314 316 |
| | | 312 | |
| | C'S CUSTOMER | n/a | |
| | C'S FOLDER | n/a | |
| | C'S DELIVERABLE | n/a — 318 | |
| | C'S DATE/TIME | n/a | |
| | NOTES | Tue. 2/1/00 @ 12:46 pm - First received Celeste's request. Tue. 2/1/00 @ 9:08 am - First received Celeste's request. | |
| | | 320 | |
| | | 322 | |
| | CELESTE'S INFO | 324 | |
| | WORK PHONE 650 208-4959 | | |
| | | E-MAIL | |

FIG. 11

THE DELIVERABLE LIST VIEW

FIG. 12

THE SHOW CHAIN FORM

| | | | |
|---|---|---|---|
| | | RMS:ShowChain — 400 | |
| 442 — DONE | CUSTOMER | Murrali Rangarajan | ELEMENTS OF SATISFACTION |
| | SUPPLIER | You | 95+ Quality/Non-Variability |
| | DELIVERABLE | Report XYZ | |
| 362 — NEW | SPECIFICATIONS | Word Document | |
| 366 — CHANGE REQUEST | DUE DATE/TIME | 08/12/00 Saturday 10:13 pm | |
| | FOLDER | XYZ Report | CORRESPONDENCE \| NEGOTIATION |
| | CC LIST + | Ajit Gokhale | BCC: via E-Mail Yes |
| 368 — HISTORY | | Celeste Baron | BCC: via E-Mail No |
| | NOTES | Fri. 1/21/00 @ 11:25 am - Agreed to provide this report to Murrali. We had discussed my participation during this weeks op meeting. | |
| 370 — SYNCH WITH SERVER | USER ALT INFO | | |
| 372 — QUIT | OFFICE PHONE (510) 498-7010 | | |
| | | STATUS DUE TIME CONTACT DELIVERABLE | |
| | CUSTOMER | 08/12 10:13 ⟶ Murrali Rangarajan Report XYZ | |
| | SUPPLIER | Request 04/04 3:00 ⟵ Steve Dewitt Toshiba Statistics | |
| | | Modify? 06/21 9:00 ⟵ Peter Katz XYZ Report Data - Logistix | |
| | | Request 06/21 11:00 ⟵ Ajit Gokhale XYZ Report Data - Financial | |
| | | ✓ 06/26 2:00 ⟵ Tom Duck XYZ Report Data - Federal, State, Local Re | |
| | | 06/28 2:00 ⟵ Scott Maidment XYZ Report Data - Public Relations | |
| | | On Hold 07/02 12:40 ⟵ Raj Muni XYZ Report Data - Operations | |
| | | ✓ 07/02 10:30 ⟵ Amad Doratotaj XYZ Report Data - HR | |
| | | E-MAIL 386 \| CONTACTS 388 \| WINDOWS 392 | |

FIG. 13

ELEMENTS OF CUSTOMER SATISFACTION FORM

| | Elements Of Customer Satisfaction | |
|---|---|---|
| SUPPLIER | Celeste Baron ~420 | |
| DELIVERABLE | ABC Report ~422 | |
| TEMPLATE | 5 STANDARD ELEMENTS | ELEMENTS OF CUSTOMER SATISFACTION ~426 |
| CURRENTLY SELECTED ELEMENTS OF CUSTOMER SATISFACTION | Consistency Of Performance<br>Commitment To Continuous Improvement<br>Focus On Customer's Wants & Needs<br>Eagerness To Please Customer<br>Dependability<br>~424 | Bob's Element<br>Commitment To Continuous Improvement<br>Consistency Of Performance<br>Constancy Of Purpose<br>Cost Of Doing Business With Supplier<br>Cycle Time (One Unit)<br>Dependability<br>Eagerness To Please Customer<br>Focus On Customer's Wants & Needs<br>Gets Accurate, Complete, & Timely<br>Gives Accurate, Complete, & Timely<br>Importance Of Customer To Supplier<br>Information/Communication<br>Minimize Risk<br>Openness/Honesty/Loyalty<br>Pricing Of Extras<br>Processes/Systems Design<br>Processes/Systems Implementation |
| TEMPLATES ▼ | ~434 | |
| | ~436 CLEAR ALL | ADD A NEW ELEMENT  DELETE SELECTED |
| SELECTED ELEMENT | Minimize Risk ~430 | ~438  ~440 |
| ELEMENT DESCRIPTION | This would be a descriptive line or two about the meaning of 'Minimize Risk'.<br>~432 | |

428 (top arrow), 442 DONE

FIG. 14

ELEMENTS OF CUSTOMER SATISFACTION SCORE FORM

FOLDER SELECTOR FORM

| | FOLDER | AMS Ideas | | CC LIST | |
|---|---|---|---|---|---|
| DONE | FOLDER HIERARCHY | Desktop | | Celeste Baron | |
| | | | | Murrali Rangarajan | |
| INSERT FOLDER | | AMS | | Raj Muni | |
| | |   AMS Ideas | | Steve Weinstein | |
| | |   Panorama AMS | | | |
| RENAME FOLDER | |   WebAMS | | | |
| | |     WebAMS Development | | | |
| | |   XYZ Report | | | |
| DELETE FOLDER | | Cash Payments | | | |
| | | Cooky | | | |
| | | Inyo | | | |
| FILL WINDOW | |   AMS Software Development | | | |
| | |     Allan & Jim | | | |
| | |   General Inyo Stuff | | | |
| | |   Inyo Legal | | | |
| | | Laser Reflections | | | |
| | FIND | | | VIEW/MODIFY CC LIST | |

FIG. 16

RECIPIENT LIST SELECTOR FORM

| | RECIPIENT | NEGOTIATIONS | | CORRESPONDENCE | | | | TRANSMISSION METHOD | | | SOURCE |
|---|---|---|---|---|---|---|---|---|---|---|---|
| DONE | | YES | NO | TO | CC | BCC | NONE | E-MAIL | FAX | PRINT | |
| | Celeste Baron | • | | | • | | | • | | | Folder |
| SAVE AS A GROUP | Murrali Rangarajan | • | | | • | | | • | | | Folder |
| | Nicolette Kavanagh | • | | | • | | | • | | | Agreement |
| | Raj Muni | • | | | • | | | • | | | Folder |
| RESET | Steve Dewitt | • | | | • | | | • | | | Agreement |
| CLEAR ALL | | | | | | | | | | | |
| CANCEL | | | | | | | | | | | |

| RECIPIENT GROUP NAME | | | | | | |
|---|---|---|---|---|---|---|
| NEGOTIATION ACCESS | | DEFAULT | ☒ YES | ■ NO | | |
| CORRESPONDENCE | | DEFAULT | ■ TO | ☒ CC | ■ BCC | ■ NONE |
| TRANSMISSION METHOD | | DEFAULT | ☒ E-MAIL | ■ FAX | ■ PRINT | |

FIG. 17

E-MAIL FORM

| | |
|---|---|
| SEND NOW | TO: Amad Doratotaj |
| | CC: Celeste Baron |
| | CC: Raj Muni |
| SEND LATER | DELIVERABLE: $200 |
| | DUE DATE/TIME: 1/31/00　　Monday　　12:00 am |
| ATTACH FILE | ATTACHMENTS: |
| | SUBJECT: |
| CANCEL | MESSAGE: |

▼ E-MAIL　|　▼ CONTACTS　|　▼ WINDOWS

FIG. 18

AGREEMENT MANAGEMENT SYSTEM AND METHOD

CROSS-REFERENCE TO RELATED APPLICATIONS

This application claims the benefit of the filing date of prior provisional U.S. patent application, entitled "AGREEMENT MANAGEMENT SYSTEM AND METHOD", Ser. No. 60/198,731, filed on Apr. 20, 2000, which application is hereby incorporated by reference into the present application and the benefit of the filing of prior provisional U.S. patent application, entitled "AGREEMENT MANAGEMENT SYSTEM AND METHOD", Ser. No. 60/209,866, filed on Jun. 7, 2000, which application is hereby incorporated by reference into the present application.

FIELD OF THE INVENTION

The present invention relates generally to an information organization system and more particularly to the storage and retrieval of information relating to agreements by using indicia of an agreement or project as the central organizing index for the information.

DESCRIPTION OF THE RELATED ART

Current software systems have no central organizing principle for collecting and managing information. Incoming information such as telephone calls, facsimile transmissions, emails, and letters sent by post arrive in an office and require the careful attention of many people to assure that the information gets properly categorized and filed. Often the information relates to not just one central activity but to that activity and several subordinate activities on which the central activity is dependent. It is important that the information be categorized not with the central activity but with the proper subordinate activity if the information is more closely related to the subordinate activity.

In addition to the above information, other ancillary information such as contact information of the various parties involved, mailing addresses for businesses, delivery dates for deliverable items, conditions of satisfaction regarding deliverable items and a host of other information, are usually separately handled in a way that is misrelated or unrelated to the matters to which the information is connected. The result of this information handling is that appointments are forgotten or missed, telephone calls are not returned and items to be delivered are often delayed or the items that are delivered do not meet the conditions specified.

Most software systems that attempt to aid in the handling of this mass of information are systems that include independent and disconnected components for each type of information. For example, one program handles emails, another program handles contact information, and a person in the office must transcribe telephone calls or voice mails by hand and file them appropriately.

Therefore, there is a need for a software system that organizes information in a way that relates to a central activity and any of its subordinate activities so that all incoming and outgoing information is connected to the proper activity such that its retrieval is simple and intuitive and the monitoring of the progress of the activities involved is made more effective.

BRIEF SUMMARY OF THE INVENTION

The present invention is directed towards such a need. One method, in accordance with an embodiment of the present invention includes a method of organizing information around agreements. The method includes making a request by a first party for an agreement with a second party. The request contains an agreement ID that uniquely identifies the request and any agreement formed therefrom. The method further includes receiving correspondence from the second party regarding the request or any agreement formed therefrom and saving the correspondence from the second party according to the unique agreement ID. The first party has an independent agreement database and the request and any correspondence received from the second party is stored in the first party's agreement database in a record that includes the agreement ID. All subsequent correspondence that is sent from the first party to the second party is stored in the first party's agreement database in a record that includes the agreement ID. This correspondence includes transmittals related to the agreement that change the state of the agreement and transmittals related to the agreement that do not change the state of the agreement. The second party has an independent agreement database and correspondence received from the first party and correspondence sent by the second party is stored in the second party's agreement database in a record that includes the agreement ID received from the first party's request.

Another method, in accordance with an embodiment of the present invention is a method of managing agreements to form a supply chain. The method includes making a first request by a first party and receiving a first acceptance from a second party to form a first agreement between the first party and the second party. The first agreement has a unique first agreement ID and specifies a first deliverable to be received by the first party. The method further includes making a second request by the second party and receiving a second acceptance from a third party to form a second agreement between the third party and the second party. The second agreement includes a field for identifying a downstream agreement. The method further includes linking the second agreement to the first agreement by including the first agreement ID in the field identifying a downstream agreement to form a supply chain among the first, second and third parties.

One advantage of the present invention is reduced complexity. The Agreement Management System (AMS) retains a digital trail of negotiation, correspondence and completion and eliminates uncertainty between customer and supplier. While providing a common structure of agreements, the AMS, delineates all unfulfilled agreements as well as negotiations in progress. This eliminates disagreement after delivery or completion and reduces missed commitments and their potentially severe impacts.

Another advantage of the present invention is increased productivity. AMS consolidates all work requests and obligations into one structured environment. AMS automatically files all correspondence and documents with their associated agreement. AMS records time devoted to each agreement during both negotiation and fulfillment.

Yet another advantage is that the AMS facilitates continuous improvement in the performance of agreements. AMS allows each customer to clearly specify his elements for satisfaction regarding supplier performance. AMS provides for supplier performance feedback via customer evaluation. AMS clearly identifies responsible individuals.

Yet anther advantage, especially for organizations that deploy AMS company wide, is that AMS supports customer/supplier chains. Unlike current workflow applications, AMS builds its supply chains organically. The responsible individuals create their own customer-supplier agreements within the chain. AMS provides a management overview of all in-house supply chains. Overdue commitments can be flagged and action taken toward preventing missed commitments to the ultimate external customers. The agreement process for repetitive supply chain deliverables can be pre-negotiated and automated enabling one-step activation of the entire chain of agreements. Upside changes, dictated by the final customer, can be transmitted to all affected suppliers in one step. Pre-negotiated quantity versus lead-time limits to upside changes facilitate complexity free accommodation throughout the supply chain.

Yet another advantage is that AMS supports continuous quality improvement, which is facilitated at the individual level. As part of the agreement making process, each supplier receives from his customer a set of criteria defining those elements of supplier performance that comprise the customer's expected level of performance. The customer may score these "Elements of Customer Satisfaction", in either a quantitative or qualitative manner, at any time throughout the duration of the agreement. This feedback allows for the employee to self-correct or request assistance as needed. AMS provides for continuous monitoring of the quantified supplier performance evaluations. Scores below a given threshold or a trend of declining scores may be flagged to facilitate allocation of coaching resources, thereby focusing attention to where the need is greatest. Employees with outstanding evaluations can be recognized for their achievements. Companies that provide employee performance incentives can readily identify qualifying candidates.

Yet another advantage of the present invention is that it supports career development. AMS can automatically create and maintain a portfolio of each employee's accomplishments throughout his association with a company. Career development courses show up as agreements between the employee (the supplier), and the course instructor. Employees can attach to his career development folder those agreements that demonstrate significant accomplishments or desired skill sets. This enables managers to quickly assess the viability of candidates for open positions, providing work content, customer satisfaction, class work, training and other documentation that may be attached to the portfolio (awards, recognition, etc.) AMS increases employee retention by encouraging employees to grow within the company rather than by leaving the company.

Still another advantage is that AMS supports time management. Preferences may be set within AMS to allow automatic tracking of time spent on each agreement. Any activity during each time period, such as composing a document of sending e-mail, is also recorded. This facilitates billing in those professions where work is billed hourly.

BRIEF DESCRIPTION OF THE DRAWINGS

These and other features, aspects and advantages of the present invention will become better understood with regard to the following description, appended claims, and accompanying drawings where:

FIG. 9B shows a filled-in New Request Form;

FIG. 10 show an Urgents View Form;

FIG. 11 shows a Review Form;

FIG. 12 shows a Deliverable List View Form;

FIG. 13 shows a Show Chain Form;

FIG. 14 shows an Elements of Customer Satisfaction Form;

FIG. 16 shows a Folder Selection Form;

FIG. 17 shows a Recipient List Selector Form;

FIG. 18 shows an E-mail Form; and

DETAILED DESCRIPTION OF THE INVENTION

Figure 1:
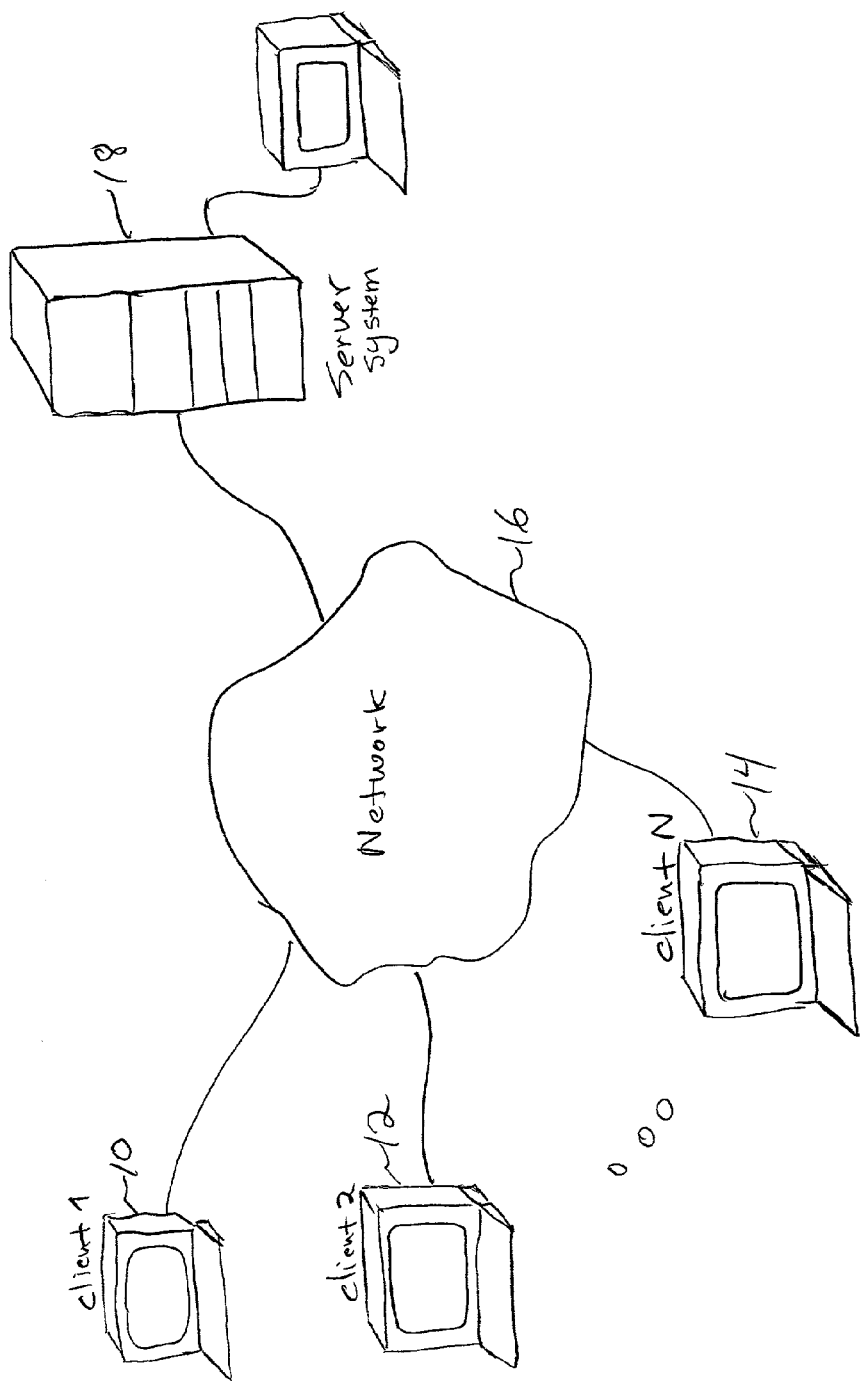
FIG. 1 shows a general system setting in which the present invention can operate.

FIG. 1 shows a general system setting in which the present invention can operate. Client (user) computer systems 10, 12, 14 have sufficient permanent local storage, such as hard disks, for storing the databases required by the Agreement Management System. A network 16 interconnects the client computer systems 10, 12, 14 and can take various forms depending on the application. If the client computer systems 10, 12, 14 are in a localized corporate setting, the network 16 is typically a local area network. If there are multiple corporate sites, then the network is typically a combination of local area networks at the individual sites interconnected by a wide area network, such as the telephone network in some form, or a network of networks such as the Internet. All that is required is that the client machines communicate with each other on a peer-to-peer basis.

Alternatively, a server system 18, connected to the network, can be used. In this case, the client computer systems 10, 12, 14 communicate with the server computer system 18 which is connected to the network 16 when sending or receiving information relating to the state of an request or agreement derived therefrom.

Figure 2:
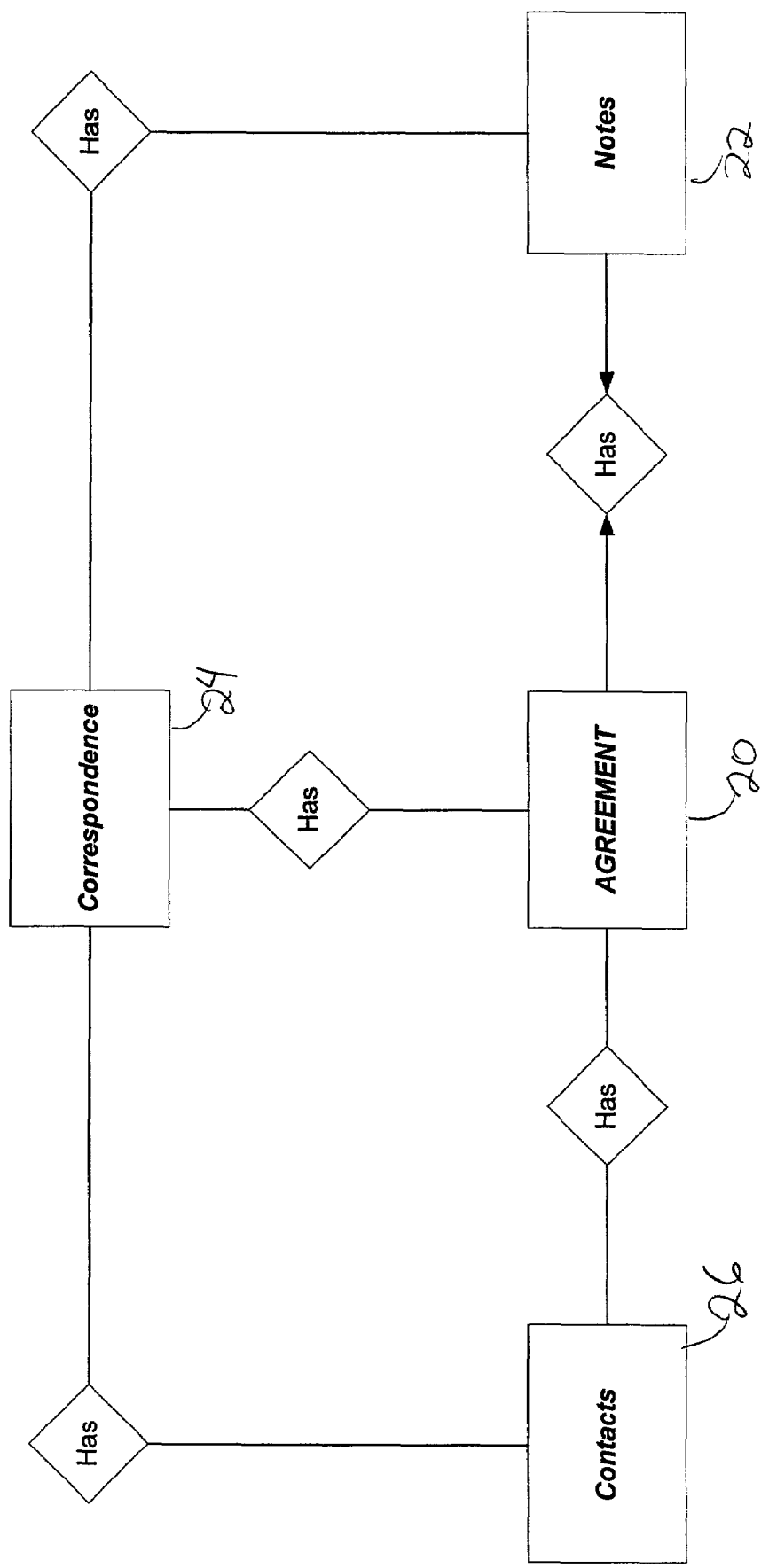
FIG. 2 shows the general relationship between the Agreement database and the other related databases.

FIG. 2 shows the general relationship between the Agreement database 20 and the other related databases 22, 24, 26. The Agreement database functions 20 as the central organizing entity for information relating to the agreements themselves as well as information that is ancillary to those agreements. Agreement information is indexed by means of an AgreementID field (attribute) and this field serves to link the ancillary databases, Contacts 26, Correspondence 24, and Notes 22, to the Agreement database 20. The Contacts database 26 contains contact information for persons and organizations which may be one of the principal parties to an agreement, as well as other non-agreement contact information. The Correspondence database 24 contains stores all correspondence that is attached to any of the agreements in the Agreements database. Types of correspondence include a document, an email, a fax, letter, draft document, draft email, draft fax and draft letter. The Correspondence database is connected to the Contacts 26 database to identify the person to whom the user sent the correspondence or from whom the user received the correspondence. The Notes database 22 contains information that is attached to agreements. There is a one-to-one relationship between the records of the Agreements database 20 and the Notes database 22. The notes in the database constitute a journal of date and time-stamped entries.

A number of other independent databases are used in the AMS of the present invention. They are the Folders database 28, the Reminders database 30, the Notebook database 32 (of FIG. 4B) and the Elements database 34.

The Folders database 28, 28a is a user-created hierarchical folder system. Preferably there are three folder systems. One is used for the storage of agreements, another for the storage of notes in the Notebook database and the third for the storage of e-mail that is not related to an Agreement.

The Reminders database 30 contains user to-do lists and user appointment lists that are unrelated to a particular Agreement.

The Notebook database 32 is a repository for notes, data, lists that are independent of any Agreement.

The Elements database 24 is a library of elements of customer satisfaction. These elements are chosen for insertion into the Agreement database 20 elements field.

It should be noted that the above-mentioned databases can be implemented in a variety of ways, including as relational tables for a relational database management system. Fields within a database are not necessarily fields of a single table. Several relational tables may be created to implement any one of the databases. Furthermore, it is preferred that each user of the AMS system has his own AMS program and set of the above-mentioned databases, which are separately maintained by the AMS installed on a machine dedicated to the user. This creates a peer-to-peer relationship between the various users 10, 12, 14 (of FIG. 1) of the AMS, in which each user has his own set of databases and maintains both public and private data relating to the user.

Alternatively, a server computer system 18, such as shown in FIG. 1, contains a central agreement database that is accessible to and shared by the users of AMS, while the other databases mentioned above reside on a user's personal computer system and are private to the user. A request for an agreement is sent by a first party to the server computer system which then stores the request in the server database in a record that includes or is linked to the assigned agreement ID. A message is then sent to the second party from the server computer system to inform the second party of the request. The second party then sends responses affecting the state of the request or agreement derived therefrom back to the server computer system which then sends any changes required to the first user. Thus, communications path between the first and second parties for messages that affect the state of the request or agreement includes the server computer system.

Figure 3:
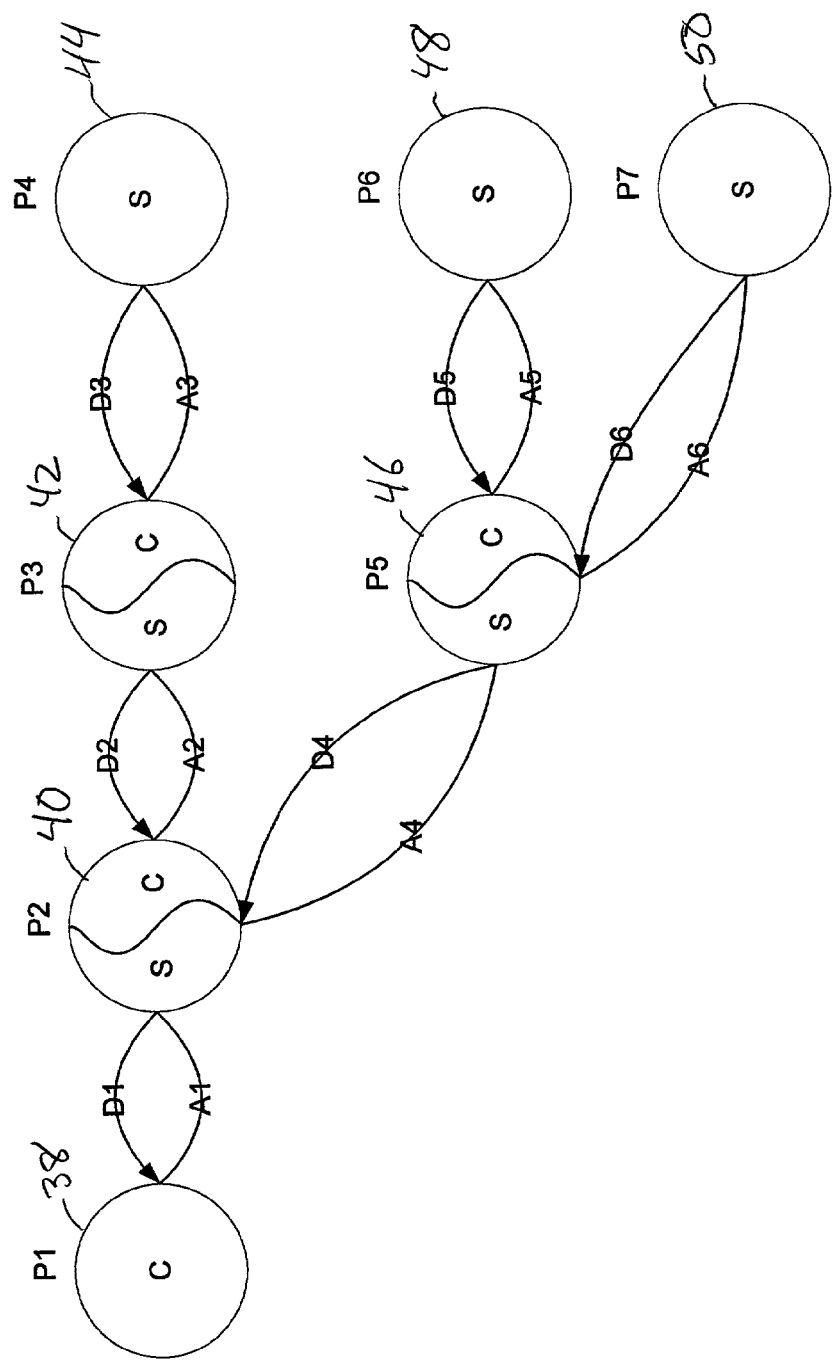
FIG. 3 shows an example of a supply chain.

Supply chains are supported by the Agreements Management system. FIG. 3 shows an example of a supply chain 36. The various agreements and the roles of the parties are set forth in the table below.

| Agreement | Deliverable | Parties (Customer, Supplier) |
|---|---|---|
| A1 | D1 | P1, P2 |
| A2 | D2 | P2, P3 |
| A3 | D3 | P3, P4 |
| A4 | D4 | P2, P5 |
| A5 | D5 | P5, P6 |
| A6 | D6 | P5, P7 |

As is apparent from the figure, the supply chain includes agreements A1–A6. Party P2 40 is a supplier (S) to P1 38 and a customer (C) of P3 42, who is a customer of P4 44. Party P2 is also a customer of P5 46, who is a customer of both P6 48 and P7 50. In one embodiment of the present invention, P2's agreement request that is sent to P3 includes an agreement ID for agreement A1 and P3's agreement request that is sent to P4 includes an agreement ID for agreement A2. Similarly, P2's agreement request to P5 includes an agreement ID for agreement A1 and P5's agreement request to P6 or P7 includes an agreement ID for agreement A4. Thus, each upstream agreement in the supply chain is linked with the immediate downstream agreement.

In another embodiment, any upstream agreement request, P2 to P3, P3 to P4, P2 to P5, and P5 to P6 or P7, contains a ChainID that is assigned when P2 makes the first request to establish a chain. In this way, every part of the chain includes the ChainID as part of the agreement record in the agreement database.

Figure 4A:
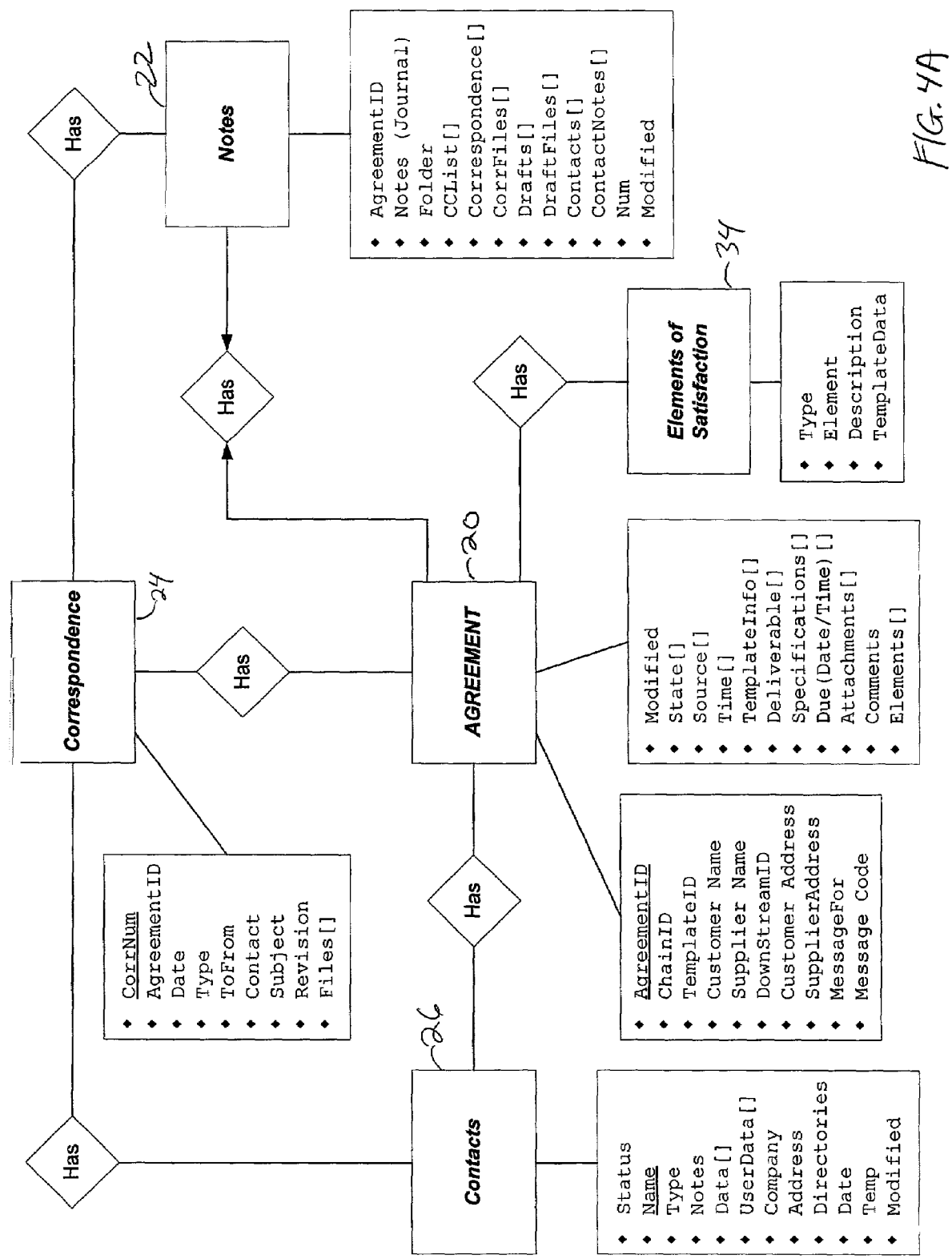
FIG. 4A shows the various fields in the Agreement, Notes, Contacts, Correspondence and Elements databases

FIG. 4A shows the various fields (or attributes) in the Agreement 20, Notes 22, Contacts 26, Correspondence 24 and Elements databases 24. These fields are described below.

Agreement Database Fields

The Agreements database contains data fields that provide information about an agreement to both the customer and supplier as well as administrative fields that facilitate the operation of AMS. With one exception, the data fields are "public" in the sense that both parties to the agreement can read them. However, no third party may view this information unless granted permission from one of the two principals. The exceptional field contains the downstream agreement ID and is explained in detail below.

The values assigned to the first five fields, AgreementID, ChainID, TemplateID, Customer, and Supplier, are set upon creation of an agreement record and do not change throughout the life of the agreement.

AgreementID—A unique value assigned to each new agreement record.

ChainID—A unique value assigned to each new supply chain. This value is assigned when the first customer in the supply chain initiates his request. All agreements created through the resulting supply chain pass on the ChainID value. This field allows for management views of the supply chain through any given organization. (This field is not shown in the above figure and is an alternative means of establishing the linkages for a supply chain.)

TemplateID—A unique value assigned to each new supply chain template. This value is assigned when the first customer in the supply chain initiates his request and assigns a template name, thereby signaling an intent to repeat the request at a future time. All agreements created through the resulting supply chain pass on the TemplateID value. This field allows AMS to automatically re-create supplier requests when each individual in the chain receives a request from his customer. (This field is not shown in the above figure.)

Customer—The receiver of the deliverable.

Supplier—The performer or provider of the deliverable.

The values assigned to the next seven fields, DownStreamID, CustomerAddress, SupplierAddress, TemplateInfo, MessageFor, MessageCode, and Modified, can be modified. The first three fields will most likely be assigned a value upon creation of the initial request and remain unchanged thereafter.

DownStreamID—When a customer makes a request of a supplier and attaches the new request to an existing commitment (one made to his own customer and the one that necessitated this new request to a supplier), the ID of that pre-existing agreement is saved as the DownStreamID. This data enables the linkage of all agreements through the supply chain. The downstream agreement is determined by and accessible to the customer only.

CustomerAddress—The URL of the customer's AMS computer system. If the customer is not using AMS, then the customer's e-mail address.

SupplierAddress—The URL of the supplier's AMS computer system. If the supplier is not using AMS, then the supplier's e-mail address.

TemplateInfo—A supplemental field for specifications that is only used when a specifications template is employed in the agreement. This field stores a five-element, "◊" separated array containing the following information:

The template name

A "◊" separated array of the template field names

??? (This element may not be in use at this time.)

??? (This element may not be in use at this time.)

The quantity of items to be delivered. (All templates must include a quantity field.)

MessageFor—The name of either the customer or supplier. This field is used to identify the party who must next act during the negotiation of the agreement. This field becomes blank once an agreement has been reached and remains blank unless a change in the agreement is requested by either of the two parties.

MessageCode—A single character indicating the current state of the agreement. This field, in conjunction with the MessageFor field, is used to select those agreements that are in negotiation for which the user must respond.

| Letter Code | Meaning | Letter Code | Meaning |
| --- | --- | --- | --- |
| A | Acceptance | U | Request for Clarification (Unclear) |
| C | Counter Offer | W | Withdrawal |
| D | Decline | Z | Archive |
| H | On Hold | c | Amended Counter Offer |
| K | Clarification | k | Amended Clarification |
| M | Modification Requested or Proposed | m | Amended Modification Request or Proposal |
| P | Proposal | p | Amended Proposal |
| R | Request | r | Amended Request |
|  |  | u | Amended Request for Clarification |

Modified—The date and time, expressed in seconds since Jan. 1, 1904, when this record was last modified.

The following eight fields, State, Source, Time, Deliverable, Specifications, Due, Attachments, and Comments, are each arrays, with array elements corresponding to the negotiation, completion and archiving states of the agreement. These states document:

The initial request or proposal

Counter offers

Requests for clarification and subsequent clarification

Periods during which the negotiations were placed on hold and messages sent during holds Requests/proposals to modify an agreement after it has been agreed upon Acceptance of a negotiation state resulting in an agreement.

Checking off as completed or rescinding a completion check.

Each new state is added to the front of the array so that the events occurred chronologically from the last element to the first. Data in these fields are never changed or deleted, only appended with additional data from each new modification to the agreement.

State—A code indicating the state of the agreement. In addition to the message codes indicated above, the state code can reflect the completion and archiving of completed agreements.

| Code | Meaning | Code | Meaning |
| --- | --- | --- | --- |
| 1 | Customer Checked off as complete | 6SZ | Withdrawn and Archived by the supplier |
| 2 | Supplier Checked off as complete | 7CZ | Archived by the Customer |
| 3CZ | Declined and Archived by the customer | 8SZ | Archived by the Supplier |
| 4SZ | Declined and Archived by the supplier | 9 | Customer rescinded completion |
| 5CZ | Withdrawn and Archived by the Customer | 0 | Supplier rescinded completion |

Source—A one-character code (C or S) indicating the party (Customer or Supplier) that created the current state.

Time—The date and time, expressed in seconds since Jan. 1, 1904, when the new state of an agreement is entered.

Deliverable—The deliverable is either a physical item or an action, the goal of the agreement. The deliverable is preferably a short phrase used to discern the deliverable from other deliverables while the specifications (defined below) give details of the deliverable.

Specifications—Details describing the terms of the agreement. This includes, but is not limited to, the physical specifications of the deliverable, the price, the purchase order number, the deliverable shipping address, etc. At times, the specifications may be entered in paragraph form. At other times, a form is used to enter the specs. If a form be used, the form name as well as the form data are stored here.

Due—The due date and time, expressed in seconds since Jan. 1, 1904, for deliverance of the deliverable.

Attachments—Any type of document or file that is attached to, and thereby made a part of, the agreement.0

Comments—Also called a "Message" field, this field stores any message the sender may wish to include when transmitting a new state of the agreement. This field is optional except when requesting clarification in which case the description of the requested clarification must be entered here.

The State, Source, Time and TemplateInfo (when a template is used) fields are filled in by the software. The Deliverable, Specifications, Due (Date and Time), Attachments and Comments fields are filled in by the initiator.

In order to minimize data storage requirements, the array elements for Deliverable, Specifications, Due and Comments are left blank (null string) whenever there is no change to the value from the prior state. For example, consider if an initial request for finger paint specifies simply the color red, the first counter offer changes the color to green, the next two counter offers maintain the specified color as green but change the due date, and the last counter changes the specs to blue before the agreement is finally accepted. This sequence occurs as shown in the table below.

| # | Action | State | Source | Deliverable | Specifications | Due |
|---|---|---|---|---|---|---|
| 6 | Supplier Acceptance | A | S | | | |
| 5 | Customer Counter | C | C | | Blue | |
| 4 | Supplier Counter | C | S | | | Oct 22, 1999 |
| 3 | Customer Counter | C | C | | | Oct 16, 1999 |
| 2 | Supplier Counter | C | S | | Green | |
| 1 | Customer Request | R | C | Finger Paint | Red | Oct 10, 1999 |

(In the example above and in the conversation to follow, the Due field is shown to contain only a due date. In reality, the clue date and time are both stored in the Due field. Time values have been omitted to simplify this example.)

Based on the above example, the State, Source, Deliverable, Specifications and Due fields contain the following values:
State="A, C, C, C, C, R"
Source="S, C, S, C, S, C"
Deliverable=", , , , , Finger Paint"
Specifications=",Blue , , , Green, Red"
Due=", , Oct. 22 1999, , Oct. 16 1999, Oct. 10 1999"

To obtain the current state of an agreement AMS uses the first non-blank value of each field's array. Reviewing the array values above, the current state is that of agreement with the supplier agreeing to the customer's prior counter offer. The deliverable, blue finger paint, is due on Oct. 22, 1999.

When reviewing the history of an agreement, any of the past states are ascertained by cropping off all ensuing states from the front of the arrays. AMS then uses the first non-blank value in each field's array. In the example above, the third state values of the fields of interest are determined by first deleting the elements corresponding to states 4 through 6:
State="C, C, R"
Source="C, S, C"
Deliverable=", , Finger Paint"
Specifications=", Green, Red"
Due="24710400, , 24192000" where the due times are in seconds after a predetermined date.

AMS then uses the first non-blank value of each field's array thereby deriving the desired past state. In this case it is a counter offer by the customer for green finger paint to be delivered on Oct. 16, 1999.

The last field in the Agreement Database, Elements, is used to store both the Elements of Customer Satisfaction and any scores of those elements. The array elements are independent of the array states listed above. Each array element corresponds to the customer either entering, modifying or scoring the elements of customer satisfaction.

Elements—A carriage return separated array of 7 "Å" separated arrays containing the Elements of Satisfaction data.
1) Type of data entry: LE (List of Elements) or SE=(Score of Elements)
2) Date (number of days since . . . )
3) General comments
4) A "Å" separated list of the elements
5) A "Å" separated list of the element description (elements which are provided in the standard choices have null strings here)
6) A "Å" separated list of element numeric scores (1–100)
7) A "Å" separated list of element comments The Contacts Database The Contacts database 26 serves as a repository for user defined preferences (group lists and agreement selection criteria) as well as contact information. The Type data field, described below, identifies the type of data store in any given record. If the Type is other than one containing contact data, than the data for that preference is stored in the Data field while the identifier assigned to that preference is stored in the Name field.

Status—A binary flag indicating the presence of user entered data (Status=On). This information is required to facilitate periodic updating of the user's contact database with a company maintained employee database. "Status=Off" records are discarded prior to merging the databases. Status=On records are retained and, if a retained contact is duplicated in the employee database, the user entered data is transferred to the new update before discarding the original record. In this manner, employee records may be maintained by a company's HR department and transparently integrated into each employee's more personal AMS contact database.

Name—Contact name. Name may also contain a distribution group name, a contact group name, or an agreement selection name. Currently, all names must be a unique value.

Type—A one character code indicating the type of contact record as follows:

| Code | Meaning | Code | Meaning |
|---|---|---|---|
| C | Distribution Group | N | Contact Group with no access to the AMS |
| D | Directory List | S | Agreement selection speed setting used on the Agreement List Form |
| G | Contact Group | Y | Contact with Access to the AMS |

Notes—A note field for the user's personal notes about the contact.

Data—For Type=N and Type=Y, an array of contact data, with each element of the array containing both a label for the data and the data value. The Data field is reserved for data entered by the host company's HR department. For example:
Data=Work Phone/(510) 498-2618,
  Work Fax/(510) 438-9486,
  Work E-Mail/jdoe@somecompany.com Users can enter additional contact data that can replace or supplement the company data. This additional data is stored in the UserData field described below. For Type=C and Type=G, an array of contact names. For Type=D, an array of Directory names. For Type=S, a five element array of selection criteria:
  Contact—(Specified Contact or All)
  Folder—(Specified Folder Number or All)
  Supplier—(User, Others or All)
  Status—(Open, Completed or All)
  Embedded—(Yes or No)
UserData—An array of user entered contact data, with each element of the array containing both a label for the data and the data value. For example:
  Data=Home Phone/(415) 123-4567,
    Cell Phone/(510) 455-6778,
    Home E-Mail/jdoe~aol.com
Company—Company name. To save storage space, a four letter code is used to indicate an employee of the host company. This code references a lookup table of company sites and addresses.
Address—Company address. This is blank for employees of the host company.
Directories—An array of integers, each integer a pointer to a Directory name. A contact can be placed in any number of directories.
Date—An administrative field used for updating the user's Contact database with his/her host company's HR-maintained employee database.
Temp—An administrative field used for updating the user's Contact database with his/her host company's HR-maintained employee database.
Modified—The date and time, expressed in seconds since Dec. 31, 1998, that this record was last modified.

The Correspondence Database

The Correspondence database 24 stores information about all correspondence that is attached to any of the AMS agreements. Data for correspondence that is originated within AMS is stored in the sender's client files upon transmission and stored in the receiver's (customer or supplier only, not cc'd recipients) client files upon saving the opened correspondence. In both cases, the correspondence is automatically attached to its associated agreement using the agreement ID that is transparently sent along with the transmission. Data for correspondence that does not originate from within AMS is stored upon saving as well. However, in this case, the user must select the appropriate agreement for attachment.

CorrNum—A unique correspondence ID number. Automatically assigned whenever either a new correspondence or draft is created or a non-AMS originated correspondence is received and saved as an attachment to an agreement.
AgreementID—The ID of the associated agreement. A null string for correspondence that is not associated with any agreement.
Date—The date of transmission
Type—A one character code indicating the type of FORMAT:

| Code | Meaning | Code | Meaning |
|------|---------|------|---------|
| D | Document | L | Letter (by post) |
| B | E-mail | d | Draft Document |
| F | Facsimile Transmission | e | Draft E-mail |
| f | Draft Facsimile | l | Draft Letter |

To From—A one character code (T=To, F=From) indicating whether the correspondence was to or from the contact stored in the Contact filed.
Contact—The name of the person to whom the user either sent or received the correspondence.
Subject—The subject of the correspondence.
Revision—Used for drafts of correspondence, stores the draft number if any.
Files—An array of file names (with associated path if necessary). The first element is the name of the correspondence file. Any additional array elements are the files of the associated attachments. An array of file names of the correspondence files referred to above. If a correspondence has attachments, the attachment's file name(s) and user defined descriptive name(s) are stored along with the correspondence file as an array. The attachments' user defined descriptive names are used for user selection. If a file is saved on the user's hard drive in a place other than the AMS Correspondence folder, then the complete folder path is stored along with the name of the correspondence file.

The Notes Database

The Notes database 22 holds information that is attached to agreements with the ID field linking each Notes database record with its corresponding Agreement. There is a one-to-one relationship between the records of these two databases. The data stored in the Notes database is "private" and viewable only to the user.

AgreementID—The ID of the associated agreement in the Agreements database.
Notes (Journal)—A chronological collection of event triggered, date/time stamped entries. The user is encouraged to add supplemental notes and additional entries at will. Triggering events include initiation of a new request or proposal, review of an incoming agreement during negotiations, modification of agreements, completion of agreements (upon checking off as completed), rescinding a prior completion, receipt or dispatch of correspondence, and entry into user defined subject, contact or meeting note fields.
Folder—The folder ID of the folder into which the user has placed the associated agreement. The Folder value is a pointer to the appropriate folder in the Folders database (see below).
CCList—A two dimensional array containing the names and associated data for additional recipients (those other than the second party to the agreement) of all correspondence initiated by the user. These names are dropped into each new correspondence window upon first opening the window. The distribution list is then available for modification by the user before transmission. Additionally, the CCList is utilized to assign permission to allow listed third parties to review (but not modify or append) the negotiation states of an agreement. Each individual's data is stored in a coma-separated array. The coma-separated arrays are, in turn, stored in a paragraph-separated array. For each individual, the following data is stored:
Name
Negotiation Access Code
  n=Negotiation Access
  null string (no value)=No access
Correspondence Copy Code
  b=bcc:
  c=cc:
  t=to:

Method of Transmission Code
  e=e-mail
  f=fax
  p=print hard copy
  null string (no value)=No correspondence coverage
Recipient Source Code
  a=agreement level recipient
  g=folder level recipient
When an agreement is placed into a folder, any distribution list assigned to that folder will be automatically added to the agreement's distribution. The user may, at any time, modify or add to that list. Those recipient entries that originated from the folder assignment are referred to as folder level recipients, while any additional recipients that were included specifically for the current agreement are referred to as agreement level recipients. Refer to the Folder database detail below for additional information regarding folder distribution lists.
Correspondence—An array of all correspondence and documents that are attached to the associated agreement. The following information is provided for each array element:
  Date of Transmission or Reception
  Style of Correspondence (e-mail, fax, letter or document)
  Direction of Correspondence (to or from) if applicable
  Either Source of Correspondence or Primary Recipient if applicable
  Subject
  If attachments were included, an icon to indicate same:+
  A typical entry appears as follows:
    Jun. 2, 1999 9 E-Mail To Tommy Smothers re Cabernet Wine +
The Correspondence field's data is used in all correspondence menus to allow the user to select any prior correspondence or document for viewing. The Correspondence field contains only the subject matter description of the correspondence; the actual correspondence is stored in the Correspondence database 24.
CorrFiles—An array of Correspondence ID numbers (CorrNum, see below) containing the record numbers corresponding to the drafts of correspondence listed in the Drafts field.
Drafts—An array of all draft correspondence and documents that are attached to the associated agreement. The following information is provided for each draft
  Date of Last Modification
  Style of Correspondence (e-mail, fax, letter or document)
  Direction of Correspondence (to or from) if applicable
  Either Source of Correspondence or Primary Recipient if applicable
  Subject
  Revision Number
  If attachments were included, an icon to indicate same: +
  A typical entry appears as follows:
    Jun. 7, 1999 Draft E-Mail To Celeste Baron re Meyers Briggs Instrument
The Drafts field's data is used in all correspondence menus.
DraftFiles—An array of Correspondence ID numbers (CorrNum, see below) containing the record numbers corresponding to the drafts of correspondence listed in the Drafts field.
Contacts—Array of user entered third party contact names and note categories. For each agreement, the user can create separate notes for contacts and/or categories.
ContactNotes—Array of notes corresponding to the Contacts array above.
Num—A field used for temporary storage during certain data manipulation.
Modified—The date and time, expressed in seconds since Dec. 31, 1998, that this record was last modified.

The Elements Database

The Elements of Satisfaction database 34 is used to store the library of elements of customer satisfaction. Each element has a definition that is a brief, one to three sentence explanation, of what the element means.
Type—Elements and their corresponding descriptions may be furnished with the software or used defined. (Preloaded elements will be a corporate preference for corporate installations and are not deletable nor modifiable.)
Element—The element of satisfaction. This may be a single word or phrase.
Description—Used to clarify of the meaning of the element.
Template Data—The user may save any set of elements and assign the sets a template name. The template name and element names are stored here.

Figure 4B:
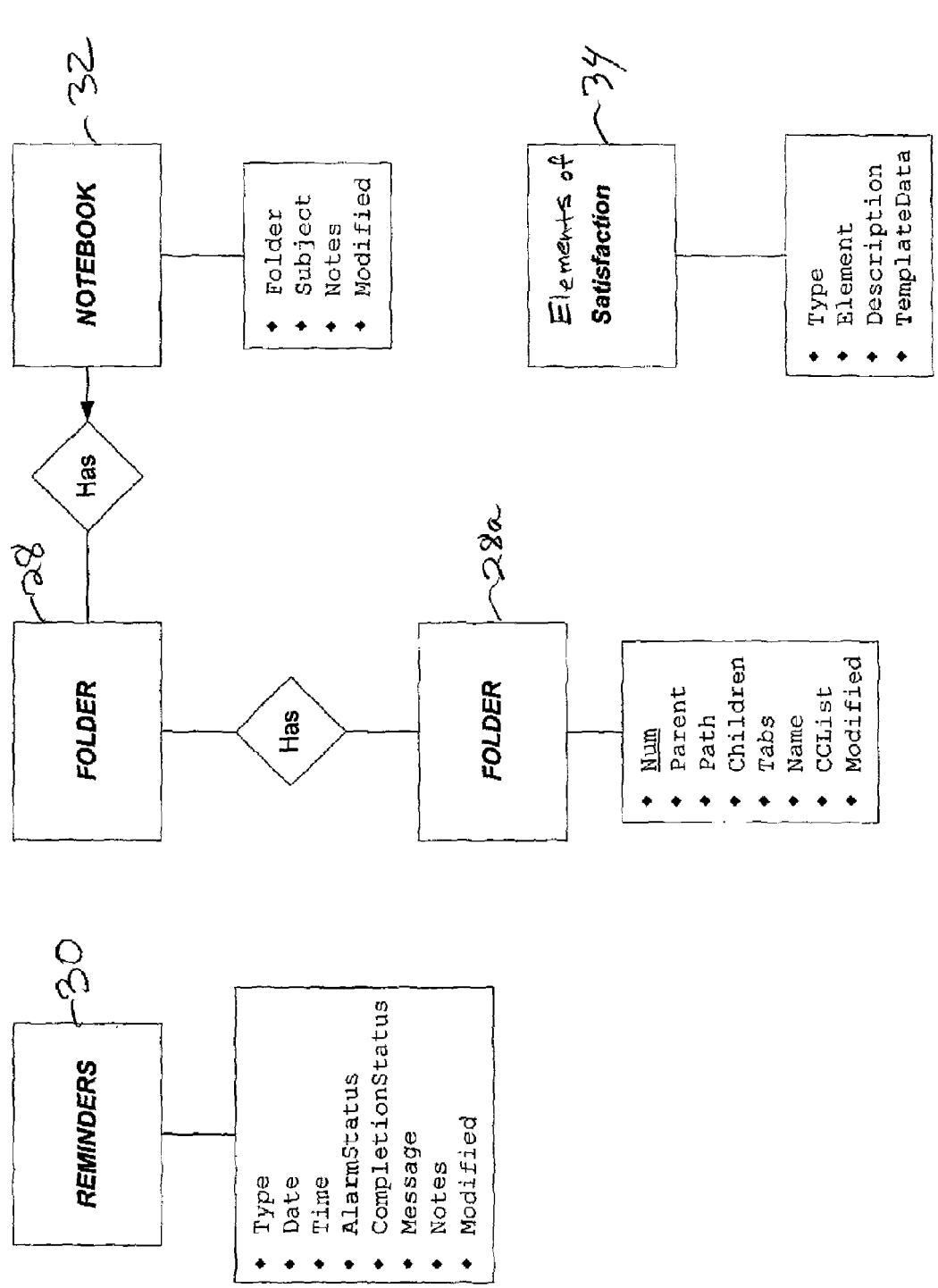
FIG. 4B shows the independent databases that are used by the AMS.

FIG. 4B shows the independent databases that are used by the AMS. These are the Folders database 28, the Reminders database 30 and Notebook database 32.

The Folders Database

The Folders database 28 stores the data for any number of user-created hierarchical folder systems. Currently, there are three folder systems envisioned for AMS. One is for the storage of agreements, one for the storage of notes in the Notebook database (described later), and one for the storage of e-mail that is not associated with any of the existing agreements. (Storage of agreement related e-mail is automatically stored by AMS with their associated agreements.) Each folder is assigned an ID number by the software and a name by the user. Folder names are not unique and can be assigned to more than one folder provided they are located in different folders. The folder ID number and not the folder name is used to differentiate folders throughout the software.
Num—A unique folder ID number. Automatically assigned whenever the user defines a new folder.
Parent—The Num of the folder in which the current folder is directly embedded.
Path—A colon separated array of folder ID Nums that corresponds to a list of folders that a user opens to get from the top level folder to the currently selected folder.
Children—A colon separated array of folder ID Nums that corresponds to a list of folders embedded in the currently selected folder.
Tabs—The number of tabs used when displaying folders in a hierarchical format. This is the level of embeddedness of a given folder within the folder hierarchy.
Name—The user entered name of the folder.
CCList—A two dimensional array containing the names and associated data for a distribution list that may be assigned to any folder. This distribution list is automatically added to the distribution list of any agreement that is placed into the folder and removed from the distribution list of all agreements that are removed from the folder, This distribution list is composed of the same data as described above for the CCList field in the Notes database.
Modified—The date and time, expressed in seconds since Dec. 31, 1998, that this record was last modified.

Reminders Database

Reminders are a stand-alone database that allows the user to create both a to-do list and an appointment list that is independent of the AMS agreements and AMS-integrated meeting scheduler. Essentially, items in the Reminders database 30 do not require the formality of making a request of a supplier or proposal to a customer. The user can enter commitments to himself or others and keep track of these items through the Reminders database 30. The appointment type of reminder has a date and time associated with it. The to-do type of reminder does not. Both types of reminders may be checked off as completed and later deleted or archived.

Type—A one character code indicating the type of reminder:
  A=Appointment
  T=To Do
Date—The reminder date or recurring date information (e.g., every Monday). Time The reminder time.
AlarmStatus—List of pending alarms. Each reminder can be given up to four alarm set points. An advanced warning of the upcoming event is displayed in a dialog box at each of these user-determined times.
CompletionStatus—A one character code indicating completion status.
Message—The reminder text, e.g.: "Lunch with Celeste" or "Pick up HR forms".
Notes—Notes associated with the reminder. The Message field may contain a short descriptive phrase while the Notes field contains additional information.
Modified—The date and time, expressed in seconds since Dec. 31, 1998, that this record was last modified.

Notebook Database

The Notebook Database 32 is a database that provides a repository for any thoughts, data, lists, etc. that may be independent of current agreements.
Folder—The folder in which the record's notes are placed.
Subject—A subdivision of notes in any given notes folder.
Notes—The actual note.
Modified—The date and time, expressed in seconds since Dec. 31, 1998, that this record was last modified.

Operation of the AMS involves the use of a number of forms described below. These forms are used to negotiate an agreement, change an existing agreement, monitor the performance of an agreement, establish a supply chain and monitor the various supply chains that are relevant to a user.

Figure 5:
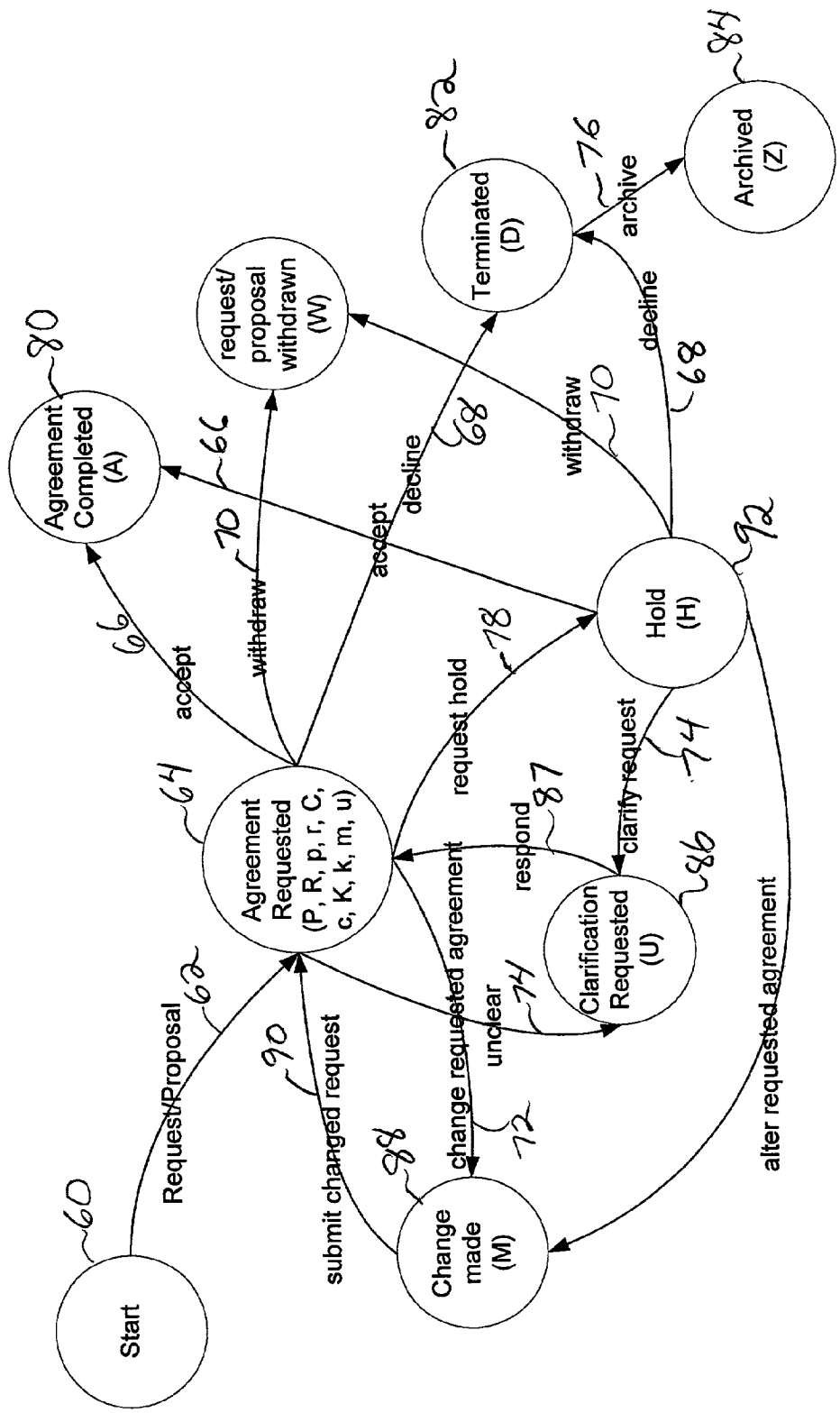
FIG. 5 shows the various pre-agreement states and transitions that are permitted by the system for a particular proposal or request.

FIG. 5 shows the various pre-agreement states and transitions that are permitted by the system for a particular proposal or request. State changes are made by either the supplier or customer, depending on the circumstances. These changes are transmitted between the independent databases of each user preferably by means of an electronic mail having the change embedded therein. These emails are interpreted by the AMS system as special in that they can affect a state change to an agreement and are thus recorded in the agreement database. Other correspondence that is not special but is related to an agreement is stored in the Notes and Correspondence databases. It should be noted that messages relating to a state change of an agreement that are subsequent to the initial Request/Proposal only include changes to the information last received. Thus, if a counter offer, by means of the Review Form, is made, for example, to a Request, only the changes to the terms of the Request are transmitted. This keeps the size of the messages sent between the users' independent databases small and improves the speed of the system.

Beginning at the start state 60, a Request 62 is made by a Customer or a Proposal is made by a Supplier. This causes the system to transition to the Agreement Requested state (P or R) 64. In this state, there is an Agreement whose terms are specified and out for consideration.

At this point, there are a number of possible responses, which include accepting the Request/Proposal 66, declining the Request/Proposal 68, withdrawing the Request/Proposal 70, changing the Request/Proposal 72, requesting a clarification 74 of the terms of the Request/Proposal, Archiving a failed Request/Proposal 76 or requesting a Hold 78 to delay a response to the Request/Proposal.

Accepting the Request/Proposal 66 causes the system to transition to the Agreement Completed state (A) 80, thus adding an Existing Agreement to the database.

Declining the Request/Proposal 68 causes the system to transition to the Terminated state (D) 82 for the Request/Proposal. At this point the failed Request/Proposal can be Archived 84.

Requesting a clarification 74 of the Request/Proposal causes the system to reach the clarification requested state (U) 86, and when a response is received to return via 87 to the Agreement Requested state (K) 64 but with the clarified terms. (Several states, P, R, p, r, C, c K, k, m, u, are shown in the same circle to simplify the diagram).

Changing the Request/Proposal 72 causes the system to transition to the Change Made state (M) 88 and back via 90 to the Agreement Requested state 64 but with the changed terms (m). At this point the changed Request/Proposal can then be accepted 66, declined 68, withdrawn 70, held, or changed again.

Requesting a Hold 78 causes the system to enter the Hold state (H) 92, thus delaying the response to the Request/Proposal that is requested in the Agreement Requested state 64. Exit from the Hold state 92 can either take place by accepting 66, declining 68, withdrawing 70, requesting a clarification 74, or changing the terms of the Request/Proposal 72.

Ultimately, the system transitions to either the Agreement Completed state (A) 80 or the Terminated state (D) 82 for a particular Request/Proposal. As an additional feature of the system, the initiator and recipient of a Request/Proposal can be one and the same user. If so, the user is creating an agreement with himself. In this case, the state of the agreement changes from Agreement Request directly to the Agreement Completed state.

Figure 6:
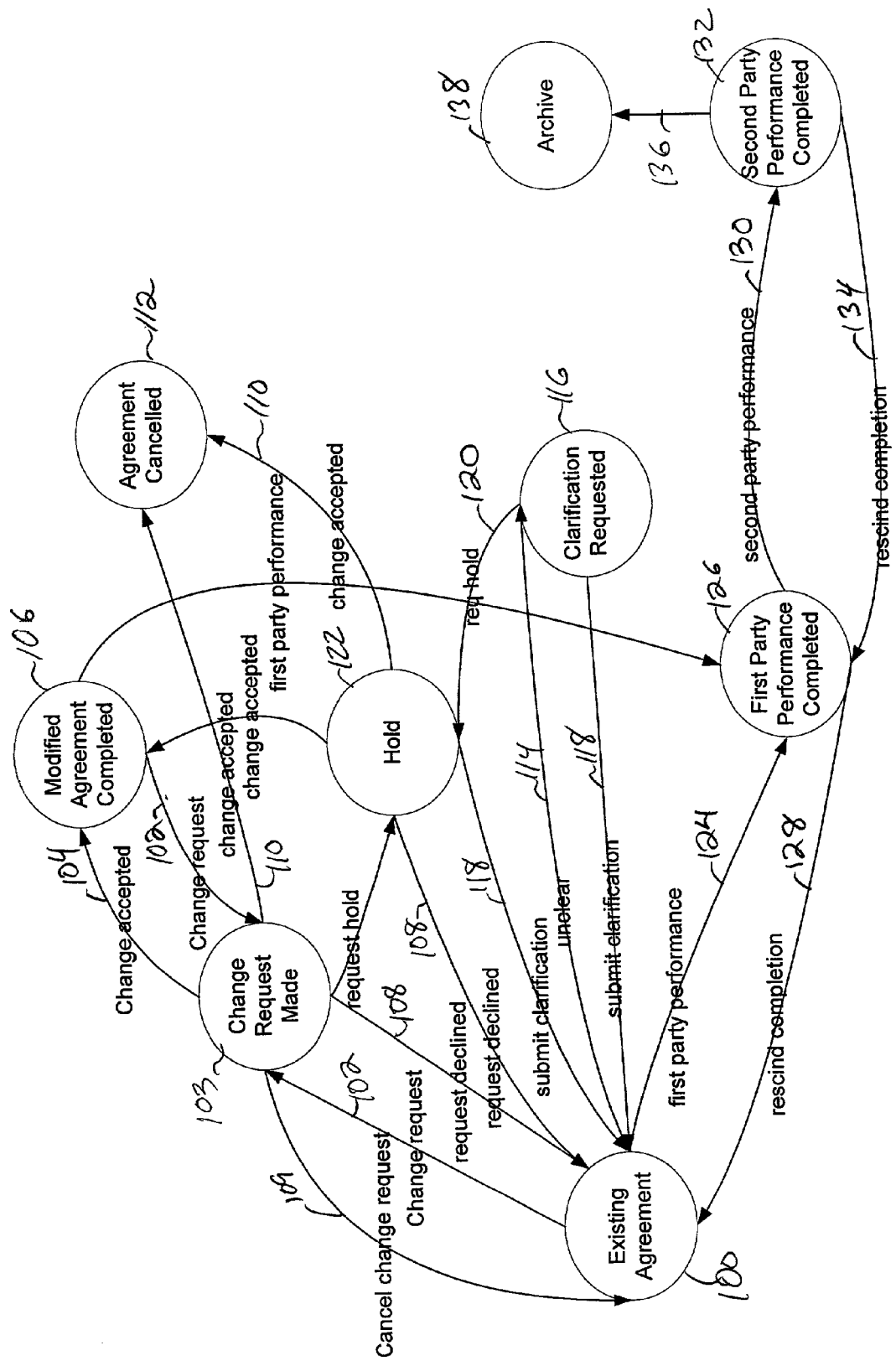
FIG. 6 shows the states that are supported by the system after there is an existing agreement.

FIG. 6 shows the states that are supported by the system after there is an existing agreement. Several state changes are possible while there is an existing agreement 100 that has yet to be performed.

A change Request can be made 102, causing a transition to the Change Request state 103. In this state the change can either be accepted 104 by the party not making the request, declined by that party 108 or the change request can be cancelled 109. If the change is accepted the agreement transitions to the Modified Agreement Completed state 106. In this state the existing agreement has had some or all of its terms changed, but agreement by both parties is required for the change. If the change request is declined 108 or the requesting party cancels the change request, the existing agreement 100 is still in effect.

Alternatively, a request can be made 102 to effectively cancel the agreement by removing the deliverable. If both parties agree to this change via transition 110, then the Agreement is cancelled and the agreement enters the Agreement Cancelled state 112. If one of the parties does not agree to cancel the agreement via 108, then the existing agreement 100 is still in effect.

A clarification to the existing agreement can be requested 114 (causing state 116) and if both parties agree to the clarification via 118, the existing agreement 100 is performed but under the clarified terms. If one of the parties does not agree to the attempted clarification, then the existing agreement 100 is still in effect without the proposed clarification.

A hold can be placed 120 on any response (causing state 122), such as agreeing to a change, agreeing to cancel, or agreeing to a clarification, that may be due. An exit from the hold provides the response that is decided upon.

After one of the parties delivers his deliverable 124 (causing state 126) under the agreement, the system permits the completion to be rescinded via 128 if there was an error in the performance or the party wants to change the existing agreement. After the second party delivers his deliverable under the agreement 130 (causing state 132), the system permits the completion to be rescinded 134. After both parties have completed their obligations under the agreement, the Agreement is fully executed and can be archived in 138 via 136.

Figure 7:
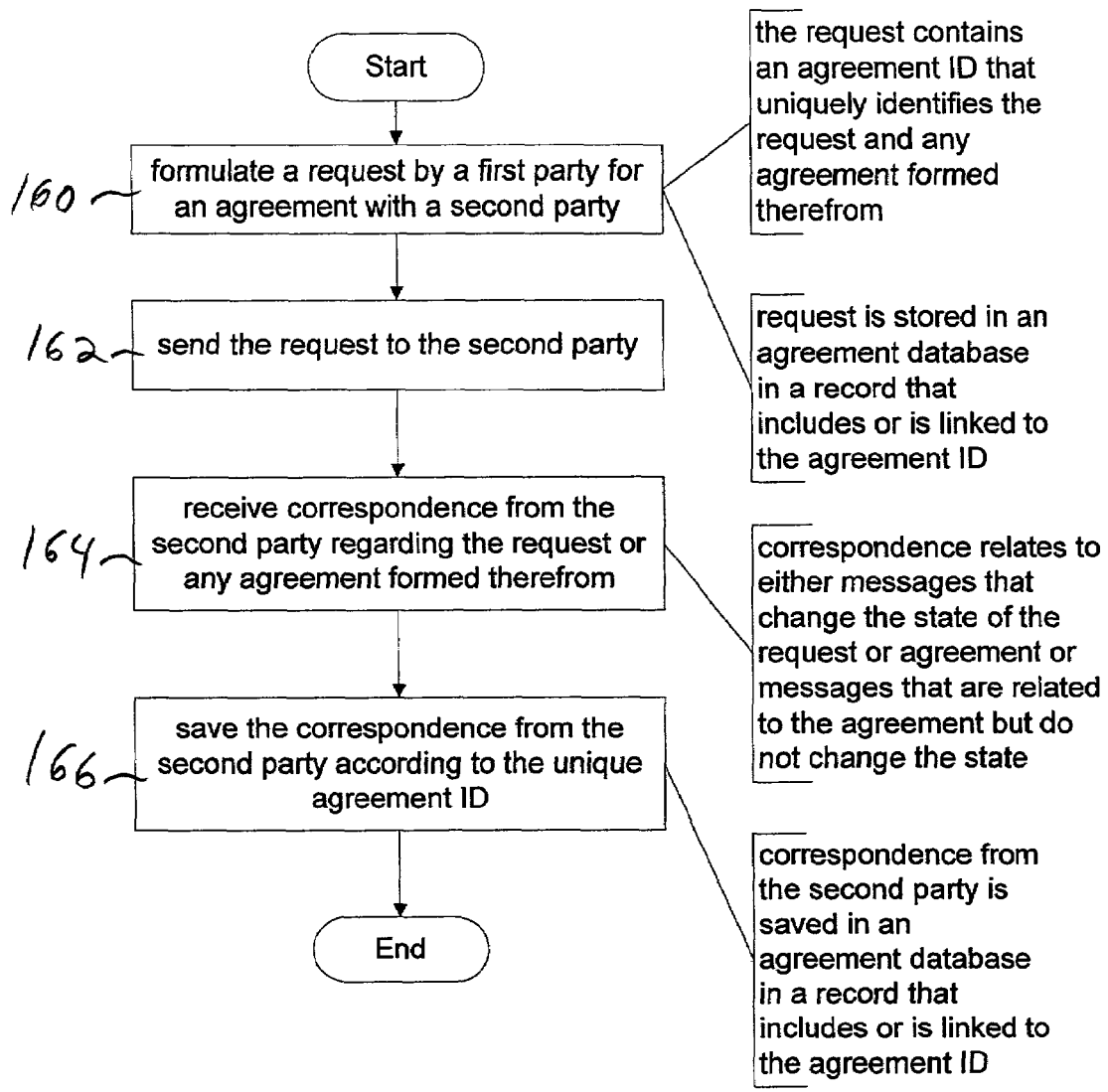
FIG. 7 shows a flow chart depicting a method, in accordance with the present invention, of organizing information around agreements.

FIG. 7 shows a flow chart depicting a method, in accordance with the present invention, of organizing information around agreements. In one embodiment, this method is carried out by the use of the New Request/New Proposal Form, the Urgents Form and the Review Form, which are discussed below. In step 160, a request is formulated by a first party for making an agreement with a second party. The request can be formulated using the New Request/New Proposal Form or other equivalent form. The request contains, among other things, an agreement ID that is uniquely assigned by the system. This ID identifies the request and any agreement that is subsequently formed based on the request. The request is stored in the agreement database in a record that either includes the ID or is linked to the ID. The agreement database can reside either on the client computer system, 10, 12, 14, of FIG. 1 or on the server system of FIG. 1, wherein, in the latter case, the agreement database is shared among the clients. In the former case, each client has his own agreement database, independent of the others.

Next, in step 162, the request is sent to the second party preferably by an email that includes the agreement ID. Because the initial request has an ID in it, the AMS system that receives the request recognizes that it is a request for an agreement and, if the environment is the peer-to-peer connection, then the request is stored in the agreement database of the second party. If the environment is client-server, then the request is stored in the server's agreement database, and a message is sent from the server system to the second party that a request for an agreement was sent.

In step 164, correspondence is received from the second party regarding the request and if the correspondence contains the agreement ID (which is the case when the correspondence relates to changing the state of the request or agreement), the correspondence is stored in the agreement database of the first party in step 166, in the case of the peer-to-peer arrangement. In the client-server arrangement, the correspondence is stored in step 166 in the server's agreement database. In either case the correspondence is stored in a record that either includes the agreement ID or is linked to the agreement ID. If the correspondence does not change the state but is related to the agreement, that correspondence is stored in the correspondence database and gets and entry in the notebook database indicating its presence. Thus, all correspondence that relates to the request or agreement formed based on the request is stored in a way that is accessible under a unique agreement ID.

Figure 8:
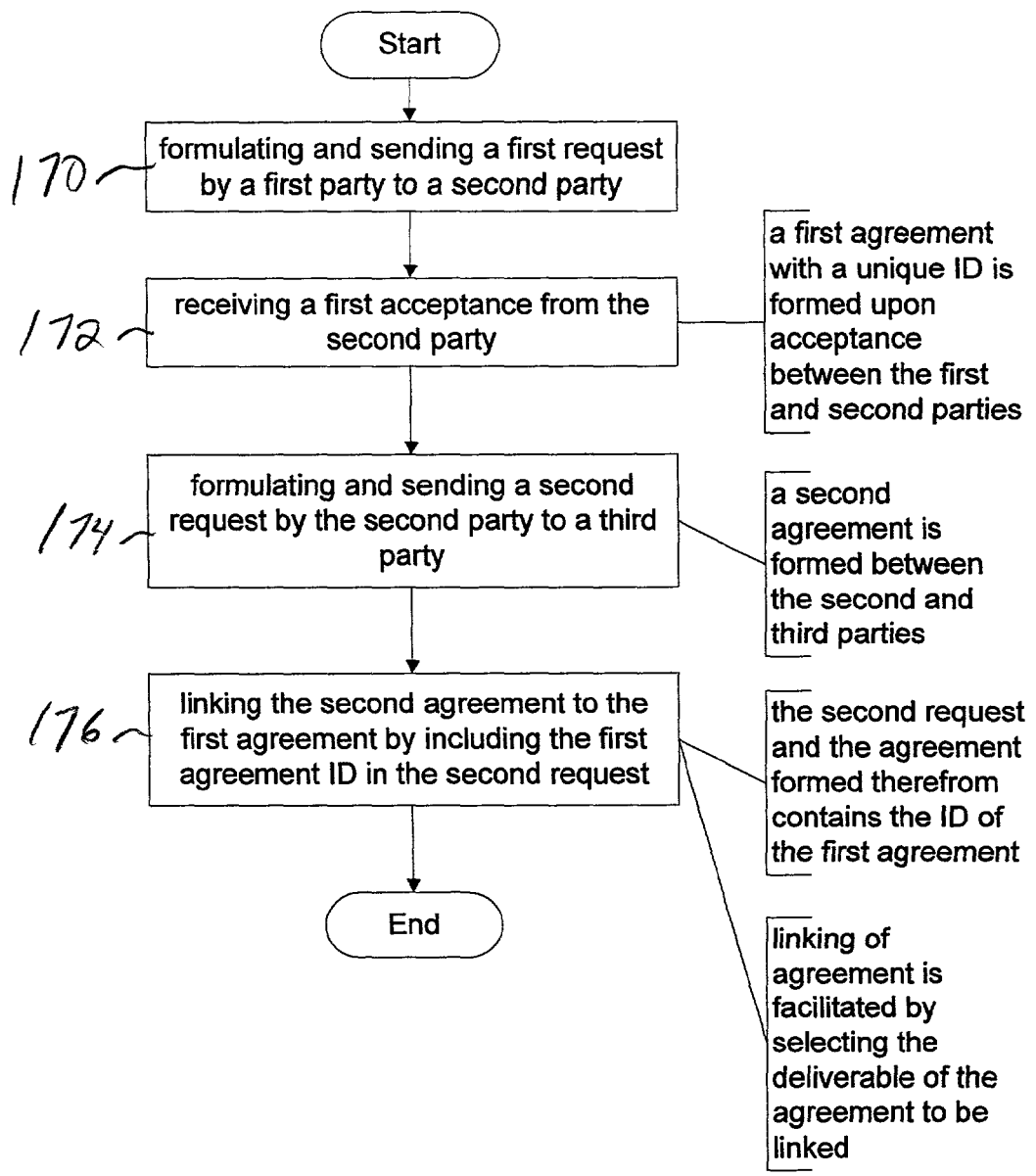
FIG. 8 shows a flow chart depicting a method, in accordance with the present invention, of managing agreements to form a supply chain.

FIG. 8 shows a flow chart depicting a method, in accordance with the present invention, of managing agreements to form a supply chain. The various forms discussed below are also preferably used to establish a supply chain, by proper entries into the fields of the form. Other forms can be used as well, as long as they provide the equivalent information.

In step 170, a first request is formulated and sent by a first party to a second party. Upon receiving the request and accepting the request, an agreement is formed between the first party and the second party in step 172. The first agreement has a unique ID and specifies a deliverable to be received by the first party from the second party.

Next, in step 174, a second request is sent by the second party to a third party, which upon acceptance forms a second agreement between the second party and the third party. The second request includes a field that identifies the downstream agreement (the agreement between the first party and the second party) and the second agreement becomes linked with the first agreement in step 176 by including the ID of the first agreement in the second request (and agreement resulting therefrom).

Linking of the downstream agreement with an upstream agreement is facilitated by selecting the downstream deliverable. Preferably, the AMS presents a list of deliverables so that one of them can be selected by the user. The list of deliverables can be filtered by selecting a customer among a list of customers, by the due date of the deliverable that is entered in the second request (deliverables after that date are the relevant ones), by the folder or by a combination of these qualifiers.

The New Request/New Proposal Form

Figure 9A:
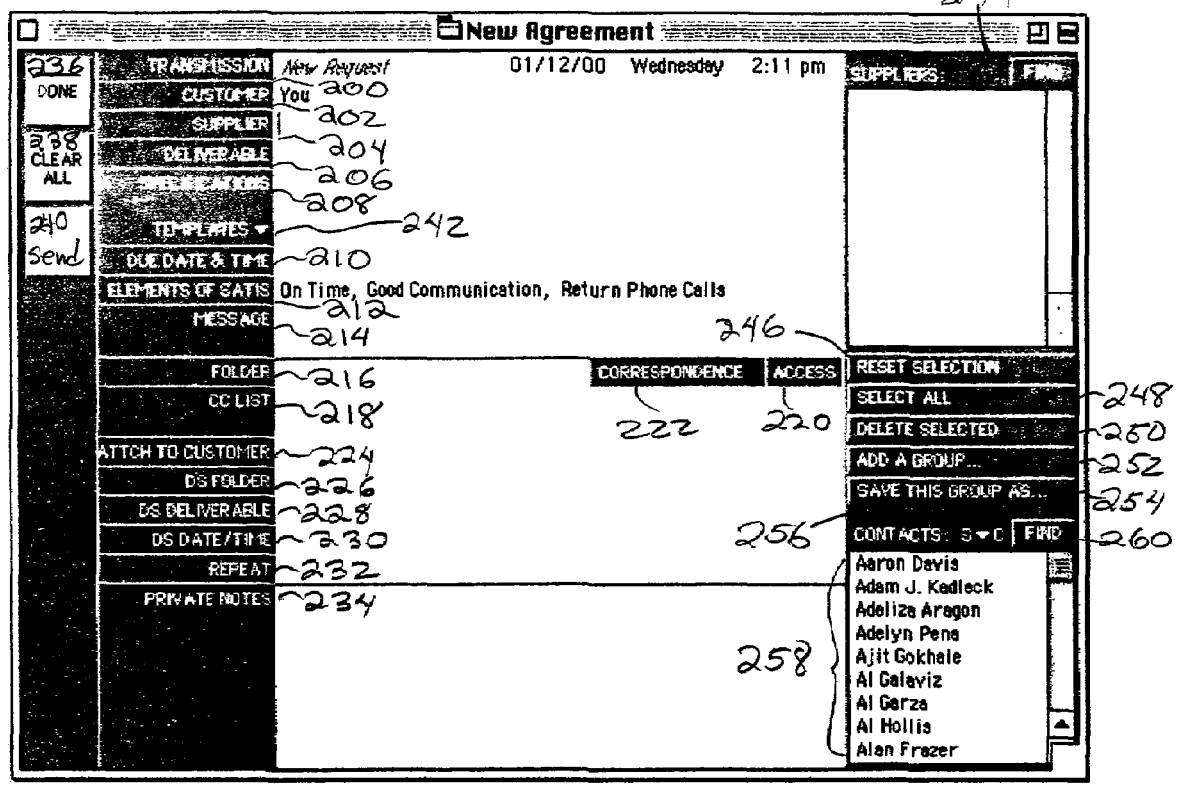
FIG. 9A shows a New Request/New Proposal Form.
Figure 9B:
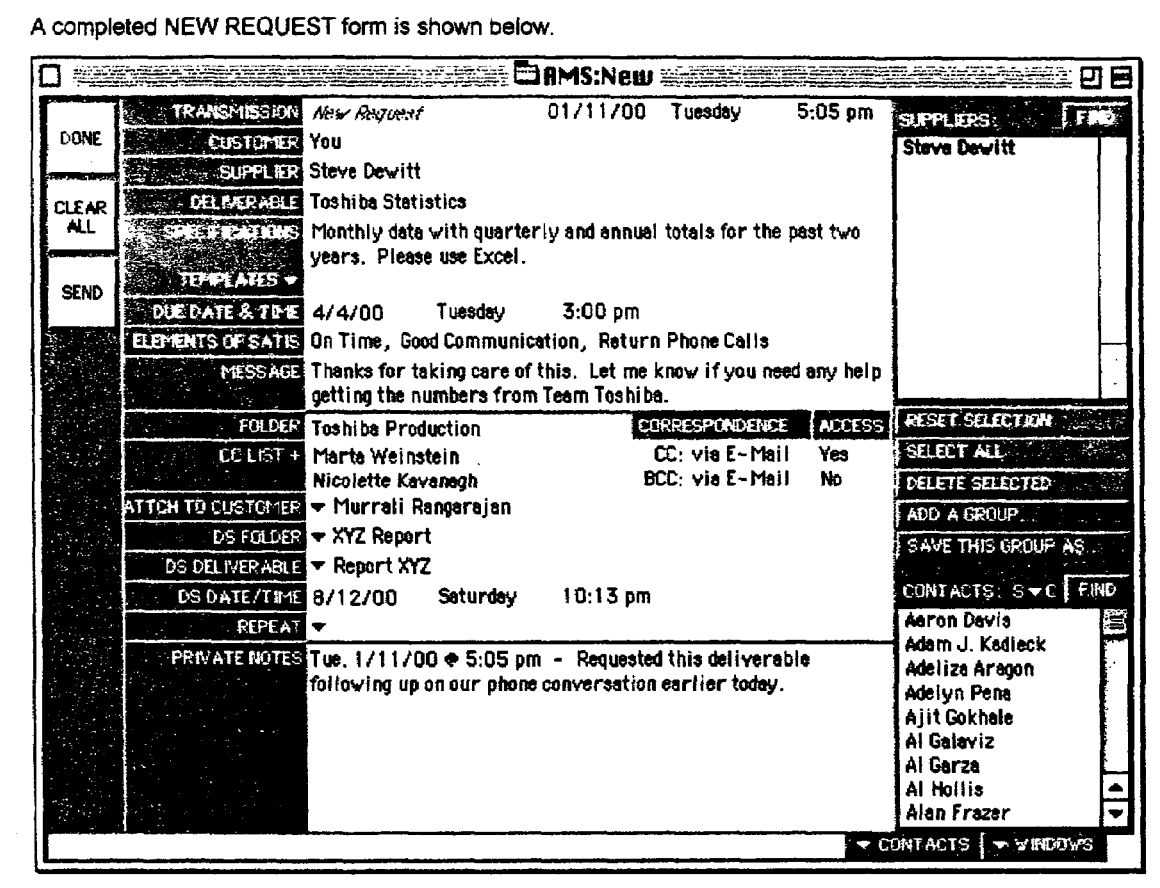

FIG. 9A shows a New Request/New Proposal Form and FIG. 9B shows a filled-in New Request Form. A new agreement starts with either a new request if the customer starts the process or a new proposal if the supplier starts the process. A new request or proposal requires that a form be filled out by either the customer or supplier and this form enters data into one or more databases described above or retrieves information from those databases. Some of the fields in the form are accessible to both the supplier and customer of the agreement and some of the fields are private to either the customer or supplier who is filling out the form.

The transmission type, date and time fields in the form are pre-assigned their appropriate values. These fields are disabled. The Customer field is pre-assigned to indicate that the user is the customer for this deliverable. If the user has created a default value for Elements Of Satisfaction, then the default value is displayed upon form opening, as shown.

On occasion, the supplier initiates the negotiation and, in doing so, makes a Proposal to his customer. In that case, the same form is utilized but it is titled NEW PROPOSAL, the Supplier field is pre-assigned to indicate the user, the Elements Of Satisfaction field is assigned the value "n/a" (not applicable) and the cursor is flashing in the Customer field. Suppliers cannot enter the Elements of Satisfaction because this field can only be entered or modified by the customer.

In either form, entering an empty value in the supplier or customer field toggles the form from New Request to New Proposal and back again.

On this, as well as other forms discussed below, the data fields are separated by a darker horizontal rule just below the Message field. The fields above the rule display information that is available to both parties of the agreement and make up the components of the agreement, such as CUSTOMER, SUPPLIER, DELIVERABLE, SPECIFICATIONS, DUE DATE AND TIME, MESSAGE, AND ELEMENTS OF SATISFACTION. Those fields below the rule are private to the user. These fields include Folder, CC List, Downstream Customer, Downstream Folder, Downstream Deliverable, Downstream Due Date and Time, Repeat and Notes. Both the customer and the supplier have their own data for these fields, which are exclusive and private. The values stored in each of these fields are explained in more detail below.

TRANSMISSION TYPE Field 200—This value clarifies the current state of the negotiation. This field is non-editable; the software generates the value displayed.

CUSTOMER Field 202—As the user begins to enter the name of his customer, the system checks the user input against the user's contacts database. In fact, a system check takes place any time a name is entered into a name-type data field. If the entered name is not in the use's contact database, then a dialog box appears asking if the user wishes to add that name to that database. If so, a window opens to allow the user to enter the new contact's data to the contact database. The first letter in each word is automatically capitalized.

Although agreements may only occur between individuals, the NEW PROPOSAL form has the capacity for the user to enter more than one customer when creating the proposal. In this case, the names of the selected customers are displayed alphabetically in the list box at the top right hand corner of the form. In the Customer field, the program displays "All". Upon completion of the form and transmittal of the proposal, the AMS program transmits a unique proposal between the user and each of the listed customers. This multiple customer feature eliminates the need to recreate the same proposal again for each of the recipient customers. The proposals to each of the listed customers need not be identical. Upon selection of one or more of the customers' names in the list at top right, the user can then modify the original data and effect a change in the proposal to the selected customers. The buttons below the customer list aid in the creation, modification and deletion of customer or supplier lists to be used for reoccurring groups of customers or suppliers. These buttons are discussed in more detail later in this section.

SUPPLIER Field 204—This field operates in a way that is similar to the CUSTOMER field and can include multiple suppliers.

DELIVERABLE Field 206—The deliverable is preferably a short phrase or a few key words that distinguishes this deliverable from others. The SPECIFICATIONS field is used to provide detail. The first letter in each word is automatically capitalized.

SPECIFICATIONS Field 208—Specifications are either entered as free verse or on a form template. If a template is used, then a section of the template that fits in the specifications data field is visible and an icon indicating a template is shown to the left of this field. Clicking on the icon opens the template. In free verse, the first letter of each sentence is automatically capitalized.

DUE DATE & TIME Field 210—AMS understands many different date and time formats. One format contemplated herein is the concatenation of the month and day without any separating character. The appropriate year is added automatically, assuming the date falls within the next 12 months. For example, 1212 is Dec. 12, 2000, 714 is Jul. 14, 2000 and 11 is Jan. 1, 2001. If the entered has two interpretations, then the date to occur first is assumed to be the intended date. For example, 111 implies Jan. 11, 2001 or Nov. 1, 2000. If the current date is after January 11 but on or before November 1, then Nov. 1, 2000 is used. The user must enter 1/11 to explicitly indicate Jan. 11, 2001. Entering a day of the week results in a date corresponding to the next weekday to occur. Similarly, time input is facilitated by allowing the user to enter 11 for 11:00am, 15 or 3pm for 3:00pm, 1030 for 10:30am. Also, AMS checks all entered dates to see if any entered date falls on a weekend or holiday, If so, a dialog box informs the user of the situation allowing him to either retain the original date or to change it.

ELEMENTS OF SATISFACTION Field 212—These are the customers requirements for good service. They are not part of the agreement but are stored in the agreement database and are included in the history of the agreement. The Elements of Satisfaction inform the supplier of what is important to the customer. Only the customer may change the elements of customer satisfaction. This field is disabled and set to "n/a" when the supplier is making a proposal to his customer. The Elements of Satisfaction are selected using a different form than that shown above. Clicking on the ELEMENTS field opens the ELEMENTS OF CUSTOMER SATISFACTION form for selection. This form is discussed later in this document.

MESSAGE Field 214—This field contains any personal message that the user may wish to convey to the other party. The message is not part of the agreement but it is stored in the agreement database and is included in the history of the agreement. Because the NEW REQUEST/PROPOSAL form may be filled out for more than one supplier or customer at a time, the Message Field has a symbol to be replaced by the first name of each customer or supplier when the forms are transmitted. For example, a message field may contain the following message for each person in a group of recipients: "Thanks [First Name], I appreciate your help on this." The first letter of each sentence is automatically capitalized.

FOLDER Field 216—AMS folders are thought of as project related. All agreements can be assigned to a folder, which facilitates the sorting and viewing of them. Any agreement that has not been assigned a folder is placed in the Unassigned Agreements folder, which is created automatically by AMS and cannot be deleted by the user. Each user creates his own folder hierarchy. For any given agreement, the folder selection of one party is independent of the folder selection of the other party. A property of folders is their distribution list. When an agreement is assigned to a folder, then the folders distribution list is automatically assigned to the agreement. This distribution list data is displayed in the CC LIST, ACCESS and CORRESPONDENCE fields located just below the FOLDER field. The nature of the distribution list data is discussed more fully in the field descriptions to follow. Folders are selected using a different form than that shown above. Clicking on the FOLDER field opens the FOLDER SELECTION form for folder assignment. This form is discussed later in this document.

CC LIST Field 218—There are three properties of the CC LIST data: recipient name, access permission and correspondence settings. The correspondence distribution list is automatically dropped into any new correspondence (e-mail, letters, and faxes) that is created by the user. (This list is editable on the new form.) The CC List is created using a different form than that shown above. Clicking on the CC LIST field opens the CC LIST form. This form is discussed later in this document.

ACCESS Field 220—Agreements are private between the two parties of the agreement. However, either party may grant access to the negotiation status and history to any other individual or individuals. A third party that is granted access to view the agreement cannot make any changes to it. This feature may be used to allow legal or managerial review of the negotiations in progress as well as the agreements related to outstanding deliverables. The access privileges are assigned on the CC LIST form, which is discussed later in this document. Clicking on this field opens the CC LIST form.

CORRESPONDENCE SETTINGS Field 222—For each name on the CC LIST, the user may enter the preferred routing type (cc:, bcc: or to:) and the preferred method of transmission (e-mail, fax, or hard copy). The correspondence settings are created on the CC LIST form, which is discussed later in this document. Clicking on this field opens the CC LIST form.

DOWNSTREAM CUSTOMER Field 224—In a supply chain, the ultimate customer for the final product or service is downstream and the supplier(s) for the original raw materials is (are) upstream. At each node on the supply chain, value is added until the final product is produced. For any given user of AMS, his suppliers are always upstream and his customers are always downstream. For example, referring to FIG. 2, in supply chain A1, A2, A3, party P4 is the ultimate customer for the final product. The DOWNSTREAM CUSTOMER field, which is enabled when initiating a request and disabled when initiating a proposal, allows the user to link the requested deliverable to a corresponding agreement with an existing customer. When the user clicks on the DOWNSTREAM CUSTOMER field, a pop-up menu employs a filter to list all current customers (those contacts with whom the user has an unfulfilled agreement to supply some deliverable) opens. For example, in FIG. 2, if the user, who is P2, clicks on the field, the pop-up menu lists P3 and P5 as the current customers having an unfulfilled agreement. If the user has already entered a due date and due time for this new request, then the list of current customers is further processed (i.e. filtered) to display only those customers that have deliverables due after the due date and time for the deliverable entered on this request. The user selects one name from this menu and, upon selection, the possible DOWNSTREAM FOLDER values are determined by listing all folders that contain incomplete agreements with both the selected downstream customer and due dates subsequent to the due date for this new request. Similarly, the possible values for DOWNSTREAM DELIVERABLE are determined. On a NEW PROPOSAL form, this field is disabled and assigned a value of "n/a".

DOWNSTREAM FOLDER Field 226—When the user clicks on the DOWNSTREAM FOLDER field, a pop-up menu displays the possible choices conditioned on the user's selection of downstream customer, as explained above. After selection of a downstream folder, the list of possible downstream deliverables is filtered to include only those open agreements that meet both the downstream customer and folder selections. On a NEW PROPOSAL form, this field is disabled and assigned a value of "n/a".

DOWNSTREAM DELIVERABLE Field 228—When the user clicks on the DOWNSTREAM DELIVERABLE field, a pop-up menu displays the possible choices based upon the user's selection of downstream customer and folder, as explained above. The process of limiting the user's choices to be consistent with earlier downstream settings is applied regardless of the order of selection among the three downstream fields, Customer, Folder and Deliverable. The selection of the downstream deliverable causes the request to be linked to a downstream agreement via the ID of the downstream agreement. On a NEW PROPOSAL form, this field is disabled and assigned a value of "n/a".

DOWNSTREAM DUE DATE & TIME Field 230—Upon selection of the downstream customer, folder and deliverable, the applicable downstream agreement is known. The downstream due date and time are then filled in by the software for reference by the user in determining a practicable due date for this new request. It is not necessary for the requester to complete the DUE DATE & TIME fields on the top section of the form before selecting the downstream deliverable. Although not labeled above, the third field to the right of the DUE DATE & TIME displays the calculated lead time between the due date and time of this supplier deliverable and the due date and time of the selected downstream customer deliverable. This field is always disabled. On a NEW PROPOSAL form, it assigned a value of "n/a".

REPEAT Field 232—Some requests may be repeated on a regular schedule. For instance, a monthly report or a quarterly submission of work in progress. The repeat pop-up menu allows the user to set up a periodic recall of the current NEW REQUEST/PROPOSAL form for retransmission at a later date. When the user clicks on the REPEAT field, the REPEAT SET-UP form is opened. This form is presented later in this document.

NOTES (LOG) Field 234—The NOTES field holds a time and date stamped log of all activities and notes created throughout the life of this agreement. Again, these notes are private to the user and each party to an agreement has his own set of notes. Some of the log entries are automatically inserted into this field while others are manually entered. When a new request or proposal is created, the software initializes the NOTES field to a current date and time stamp plus the words "Requested (or Proposed) this agreement." The user can supplement or modify this entry prior to transmittal. The Notes field is discussed in more detail later in this document. The first letter of each sentence is automatically capitalized.

The following are additional control devices on the NEW REQUEST/PROPOSAL form.

DONE Button 236—In order to facilitate sending off more than one request or proposal while in the NEW REQUEST/PROPOSAL form, the window does not close until the user presses the DONE button. If the user presses the DONE button while there is some data that has been entered onto the form, a dialog box comes up to ask if the user wants to lose this information. If yes, the window closes. If no, the DONE button is reset and the form remains unchanged and the button is replaced by a close window box.

CLEAR ALL Button 238—The CLEAR ALL button resets the NEW REQUEST/PROPOSAL form to its initial set-up. All data that has been previously entered without transmitting will be lost.

SEND Button 240—Pressing the Send button adds the request or proposal to the user's client and server databases. Prior to transmission, the AMS software checks for completion of all required fields: CUSTOMER, SUPPLIER, DELIVERABLE, and DUE DATE & TIME. Note that SPECIFICATIONS, ELEMENTS OF CUSTOMER SATISFACTION and COMMENTS are not required. If any of the required fields are empty, a dialog box informs the user of the empty field(s) and cancels the send request. In the case of multiple customers or suppliers, then the required fields are checked for each of the recipients. Sending off a request resets the form for a new round of data entry.

RECALL Button—Although not displayed, a recall button permits the user to retrieve a just-sent request or proposal provided that the recipient has not yet opened the new request or proposal. A pop-up menu lists all requests and proposals sent since the form was opened and still available for recall. The data from the recalled request or proposal is placed into the appropriate fields of the NEW REQUEST/PROPOSAL form for modification or for deletion via the CLEAR ALL button.

SPECIFICATIONS TEMPLATE Pop-Up Menu 242—As discussed earlier in the SPECIFICATIONS field description, templates can be used to provide for concise, consistent and complete specifications data entry whenever requests for similar deliverables recur. Requesting delivery of office supplies benefits from a template listing all items ordered from the supplier. Templates can be designed in MS Word or Excel. Selecting a template from the pop-up menu opens the form for data input. The ability to create, delete and modify templates is provided for by including these options among the pop-up menu selections.

CUSTOMER/SUPPLIER LIST FIND Button 244—If a large group of suppliers or customers are listed in the Customer/Supplier list box, then the FIND button facilitates rapid location of any given customer/supplier. Clicking on the FIND button brings up a dialog box requesting the name of the customer or supplier to be located. This text box should have a link to the user's contact list so that AMS can check for the name in the contact list. When a name is entered, the list scrolls to that name.

CUSTOMER/SUPPLIER LIST SELECT Button—This button, though not displayed in the sample screen, permits a rapid selection of any given customer/supplier, if a large group of suppliers or customers are listed in the Customer/Supplier list box.

RESET SELECTION Button 246—This button is associated with the customer/supplier list. Entries and/or changes to the NEW REQUEST/PROPOSAL form are applied to those names selected in the customer/supplier list. The RESET SELECTION button deselects the selected name(s), displays the top of the list and selects the first name in the list. At the same time, the fields of form are filled with the values for the first name on the list.

SELECT ALL Button 248—This button is associated with the customer/supplier list. As its name implies, clicking on this button selects all customers or suppliers in the list. The fields of the form are filled with the values for the first name on the list.

DELETE SELECTED Button 250—This button is associated with the customer/supplier list. Upon clicking on this button, the selected names and their associated data is deleted.

ADD A GROUP . . . Button 252—This button is associated with the customer/supplier list. Each user can create and save any group of contact names; in essence, a distribution list for transmittal of requests or proposals. Clicking on this button opens up a pop-up menu listing the available group names that have been assigned by the user when creating the groups. Currently, the pop-up menu also contains selections for amending and deleting any group.

SAVE THIS GROUP AS . . . Button 254—This button is associated with the customer/supplier list. Whichever names are currently selected in the customer/supplier list are save as a new group. A dialog box opens up to request the user input a group name for the new group.

SUPPLIER AND CUSTOMER Pop-Up Menus 256—To facilitate rapid data entry when entering customers or suppliers, two pop-up menus are provided just above the contacts list box. They are currently denoted on the NEW REQUEST/PROPOSAL form by the letters 'S' and 'C' with a pop-up menu arrow between them. The user's current suppliers and customers determine the choices in the pop-up menus.

CONTACT LIST 258—This list contains all entries from the users contact database. The user's contact database is a composite of his corporate database as well as personal entries and updates or supplements to the corporate information.

CONTACT LIST FIND Button 260—This FIND button facilitates locating a contact when the complete name is unknown to the user. The user can type in the first name of the contact in the SUPPLIER or CUSTOMER field and click on the FIND button. The Contact List scrolls to the first name in the list that matches the text entered by the user. Clicking on any name in the Contacts List adds that contact to the customer/supplier list. The FIND button can be eliminated if the Contacts List automatically scrolled to the first match as the user enters each letter in a suppliers or customers name.

CONTACTS Pop-Up Menu—The CONTACTS pop-up menu (not shown) allows for a shortcut to the user's contact database without leaving the AMS environment. The users choices consist of the suppliers or customers specified in the CUSTOMER or SUPPLIER field, or the ability to enter the name of anyone in the user's contact database. This pop-up menu appears on most of the AMS screens and is illustrated and discussed in more detail below.

WINDOWS Pop-Up Menu—The WINDOWS pop-up menu (not shown) facilitates selection of open views or forms with AMS.

The Urgents Form

FIG. 10 show an Urgents View Form. Preferably, when the user enters the AMS, it is the URGENTS view that is first opened. The URGENTS view provides the mechanism for review of all ongoing negotiations that are currently in the users court, i.e. awaiting the user's response. This view lists all the requests, proposals, requests for clarification, counter offers, declines, withdrawals and requests to change existing agreements that have arrived since the user last worked in AMS. Any negotiations placed on hold by the user will be listed in the URGENTS view provided the holds have not been reviewed during the preceding XX time period, where XX is a user defined preference. Lastly, any agreements for which the negotiations have been recently completed due to the other party's acceptance of the agreement terms last transmitted by the user, will also be listed on the URGENTS form. In this special case, no action is required. They are listed here to inform the user of the recent acceptance and termination of the negotiation stage. The purpose of this view is to provide for response to all incoming new requests/proposals and to changes in potential agreements that are under negotiations. In a corporate environment, preferences can be set to always startup AMS in the URGENTS view and force the user to respond to all of the outstanding items before being allowed to move on to the other views of AMS. The user responds to each incoming item by viewing it on the REVIEW form, which is discussed in detail in the next section.

The URGENTS screen is similar to an e-mail in-basket and contains the same type of user-modification capabilities. The user can sort up on any column by clicking on the column heading. Columns can be rearranged by dragging the headings. Column sizes are adjustable. The data fields in the form are all non-editable. Clicking anywhere on a line opens up the REVIEW form for that item. Upon reviewing the item and responding to it, the user returns to an updated Urgents View that no longer lists the just responded-to item. Upon completion of the last item, AMS opens the DELIVERABLE LIST view.

If an agreement has not yet been reached and the user is the next person to respond in the process, the negotiations must be in one of six possible states. The STATUS column 280 identifies the current state of each of the incomplete agreements. These six states are as follows:

Request—A potential customer has transmitted a new request to the user, who has yet to open and review the request.

Proposal—A potential supplier has transmitted a new proposal to the user, who has yet to open and review the proposal.

Clarify?—The user had previously sent a new request, proposal, counter offer, etc to another party who had some question about the enclosed terms. That other party has returned the unaltered transmission with a request for clarification.

Counter—A counter offer has come in from a party with whom the user is currently negotiating.

Change?—A customer or supplier has transmitted a request to change an existing agreement.

On Hold—A transmission was received in one of the above states. The user did not elect to respond to the request, proposal, counter, etc at the time of receipt. The user has placed the negotiations on hold.

The default sort order is preferred to be on the STATUS column in the order presented above.

CONTACT Column 282—The name of the other party to the negotiation.

DELIVERABLE Column 284—The current value for the deliverable. The deliverable is one of the fields that may be changed during negotiation. Hence, the most recent value is displayed here.

FOLDER Column 286—The name of the folder that the user has assigned to the agreement. Note that the user will not have had an opportunity to assign incoming new requests and proposals to a folder prior to display on the URGENTS View. AMS assigns all new negotiations to the Unfiled Agreements folder.

TRANSMISSION DATE & TIME Column—Although not displayed on the illustration above, the URGENTS View includes a column that displays the date and time of transmission by the other party. If the status of a negotiation is On Hold, then the date and time should reflect the last time the user had transmitted an update regarding this agreement to the other party.

GO Button 288—Clicking on the GO button opens up the REVIEW Form for the first item on the list. Upon responding to that item, the user automatically is shown the REVIEW Form for the second item on the list. He continues to review all the urgent items in sequence without returning to the Urgents View. Upon review of the final item, AMS will automatically go to the DELIVERABLE LIST View.

EXIT Button 290—The EXIT button allows the user to close the AMS window.

STATUS Bar 292—The STATUS bar at the bottom of the screen may be used to display the number of items remaining to be reviewed.

The Review/Request to Modify Form

FIG. 11 shows a REVIEW Form. The REVIEW Form is used to review either a new request, a new proposal, a counter offer, a request for clarification, a request to modify an existing agreement, a negotiation on hold, or an agreement that has just been reached via acceptance by the other party. It is also used to request a modification to an existing agreement, and when done so, the form is renamed REQUEST TO MODIFY AN EXISTING AGREEMENT.

The data fields on this form are substantially the same as those explained on the NEW REQUEST/PROPOSAL form. The DELIVERABLE, SPECIFICATIONS, DUE DATE & TIME, and MESSAGE fields are enabled thereby permitting modification to the most recent state of the agreement. Changing any one of these fields places the agreement in Counter Offer Mode. Only the customer may click on the ELEMENTS OF SATISFACTION field to open the ELEMENTS OF CUSTOMER SATISFACTION form. In that form, he may add, delete or change the order of the elements selected for this agreement. Simply changing the ELEMENTS OF SATISFACTION does not constitute a counter offer. Note that the supplier is unable to modify the ELEMENTS OF SATISFACTION but may click on this field to display more of the elements if they are not all shown in the space provided.

The REVIEW form opens with the most recent state, state n, visible. The STATE Scroll Bar allows the user to also review earlier states of the agreement, states 1 through n−i. Although the earlier states are not changeable regarding the history of the agreement, the user may edit any of the above named agreement fields in an earlier state. Upon doing so, AMS will advance the form to a new state, state n+1, reflecting the change in the field modified by the user and the most recent state of the other fields. The user may also review an earlier state and copy and paste any field into the current counter offer, state n+1, without any modification.

The names (as well as the functions) of the buttons along the left side of REVIEW form vary depending upon the status of the information displayed on the form. Additional items on this form are detailed below.

STATE Field 300—During negotiations, each time a party to the negotiations transmits his position to the other party, a new state is added to the history of the (potential) agreement. Placing a negotiation on hold or requesting a change to an existing agreement introduces a new state. Revisiting an agreement on hold and maintaining the hold status does not add additional hold States to the agreement. (However, the date and time of each revisit is documented as part of the hold state data.) Changing the Elements of Satisfaction and/or scoring them also creates a new state. The STATE field displays the currently viewed state number and the total number of states separated by a slash '/'. This field is disabled and calculated by the software.

STATE Scroll Bar 302—The scroll bar along the top right side of the form allows the user to review each of the states of the negotiation. (The example figure above illustrates an initial request. No earlier states exist. Therefore, the scroll bar is disabled.) As states are reviewed, fields of the agreement which contain data that has been changed by the author of that state are displayed in either blue (if the changes were made by the user) or red (if the changes were made by the other party.) The color changes make it easy for the user to determine what has been modified from state to state.

TRANSMISSION DATE & TIME Field 304—The date and time of transmission for each state are displayed here. This field is disabled and calculated by the software.

RESPONSE TIME Field 306—This is the difference in time between the currently shown transmission and the preceding one. In essence, it is the time it took for the preceding negotiation state to be received and responded to. This field is disabled and calculated by the software.

ELEMENTS OF SATISFACTION Field 308—The REVIEW form has more room on it for display of the Elements of Satisfaction and demonstrates a more preferable method for listing these elements as opposed to the single line entry as shown on the NEW REQUEST/PROPOSAL form.

FOLDER Field 310—As this data is private to the user, the folder selected by the user may be modified at any time throughout the negotiation process.

CC LIST 312, CORRESPONDENCE 314, and NEGOTIATIONS (ACCESS) Fields 316—As this data is private to the user, the CC LIST data may be modified at any time throughout the negotiation process.

DOWNSTREAM DELIVERABLE Fields 318—If the user is the supplier, these fields display "N/A". If the user is the customer, then the downstream customer, folder, and deliverable fields may be modified or originally selected at any time throughout the negotiation process. (It is anticipated that this selection be made during the initial request for the deliverable on the NEW REQUEST/PROPOSAL form.) The DOWNSTREAM DUE DATE & TIME as well as the LEAD-TIME (not shown) fields are disabled. Their values are provided by the software and are a function of the customer selected downstream deliverable.

NOTES Pop-Up Menu 320—When discussing the NEW REQUEST/PROPOSAL form above, the NOTES field was presented as a singular entity. That entity was described as a log of user activity relating to the displayed agreement. On all other forms, the NOTES field is used to display not just the log but any number of user created note categories. The NOTES pop-up menu is the mechanism for selecting which notes are displayed in the NOTES field. Also included in the on the pop-up menu are selections for creating a new contact note category, a new subject note category, modifying the title of the currently displayed note category, and deleting the currently displayed note category.

If the new contact note category is selected, the user is prompted to enter the name of the contact. The user's Contact Database(s) is (are) scanned for a unique match. If the name entered is not in the Contacts Database, the user is prompted to see if he desires to add the new contact to the database. The new note category is named to reflect the contact name, 'John Doe's Notes' for example. If the new subject note category is selected, the user is prompted to enter the title of the new category, 'Ideas For Future Implementation', for example.

The user may make repeated note entries into any given note category. Each time a new entry is made, except for the default LOG (NOTES) category, a date and time stamp followed by the first sentence of the note entry (and en ellipses if more text was entered) is added to the LOG note field. If the user chose to date and time stamp his entry, then that same date and time is used for the LOG update even if some time has elapsed between the initiation and termination of the note field entry.

DATE & TIME STAMP Pop-Up Menu 322—This pop-up menu is used to place a date and time stamp at the front of the currently selected note field. (Notes are added to the top of the text field so that the most recent text is visible when the note field is selected.) The user is able to set his preference for formatting the date and time as well as his choice to place a blank line between the note field's entries. The pop-up menu also includes the ability for the user to create and destroy additional menu selections. These selections are text that follows the date and time and used to facilitate the documentation of reoccurring events. For example:

Tue. Feb. 15, 2000 @ 1:50 PM—Incoming Call:
Tue. Feb. 15, 2000 @ 1:50 PM—Outgoing Call:
Tue. Feb. 15, 2000 @ 1:50 PM—Left Message Re:
Tue. Feb. 15, 2000 @ 1:50 PM—Received Message Re:
Tue. Feb. 15, 2000 @ 1:50 PM—Meeting Notes Re:
Tue. Feb. 15, 2000 @ 1:50 PM—Outgoing Call regarding order status.
Tue. Feb. 15, 2000 @ 1:50 PM—Left Message requesting order status.

The user can be as specific as he likes. The menu choices should display only the first line of the message without the date and time stamp.

CONTACT INFO Pop-Up Menu 324—The Contact Info pop-up menu displays all the phone numbers and e-mail addresses that exist in the contact database for the users customer/supplier for the displayed agreement. Selecting a phone number dials that number; selecting an e-mail address brings up a pre-addressed e-mail form. Some of this data is displayed below the pop-up menu and is a function of the window size. Included in the pop-up menu selections is the selection to view the contact's page in the contact database.

If the user uses the Notes pop-up menu to select a contact-based note category (John Doe's Notes), then the CONTACT INFO pop-up menu changes to reflect the name of the contact for which the notes were created (John's info). The data below the pop-up menu is also changed to reflect the selected note field.

ACCEPT Button 326—This button remains enabled as long as the incoming agreement fields remain unchanged. Clicking on this button terminates the negotiation process and finalizes the agreement.

HOLD Button 328—The HOLD button is always enabled. It allows the user to put off a response to the other party. Any changes made to the terms of the agreement are saved and displayed upon the next review of the held agreement. Should the user enter a message explaining his reason for the hold prior to clicking on the HOLD button, the other party receives that message and better understand the delay. If the HOLD button is pressed without a prior message, AMS presents a dialog box suggesting the user enter a message. AMS will allow a hold to go through without a message being sent.

DECLINE Button 330—Only the recipient of the original request or proposal can decline during negotiations. The DECLINE button for that party is enabled throughout the life of the negotiation.

WITHDRAW Button (not shown)—Only the initiator of the original request or proposal can withdraw that item during negotiations. The WITHDRAW button for the initiator is enabled throughout the life of the negotiation. The WITHDRAW button may toggle with the DECLINE button since the two are mutually exclusive.

COUNTER OFFER Button (not shown)—The COUNTER OFFER button is enabled after the user makes a change relating to the current terms of the request or proposal. Because a counter offer and an acceptance are mutually exclusive response, only one of the buttons, the COUNTER OFFER button or the ACCEPT button, is enabled in the form.

UNCLEAR Button 332—This button remains enabled as long as the incoming agreement fields remain unchanged. Clicking on this button returns the agreement to the other party for clarification. The user should enter a message to the other party specifying his uncertainty about the other party's position. If the UNCLEAR button is pressed without a prior message, AMS presents a dialog box requesting the user enter a message. The program will not transmit a request for clarification without some message.

RESPOND Button (not shown)—If the user receives an agreement for which the other party has requested clarification, the REVIEW form displays the RESPOND button. The user presses this button after making his clarifications to the current state of the agreement.

OKAY Button 326—When one party accepts the negotiation position of the other party by clicking on the ACCEPT button, the agreement is flagged to next appear on the other party's URGENT screen as ACCEPTED. This informs the receiving party of the acceptance. When the REVIEW form displays the accepted agreement, OKAY is the only button visible. The user presses this button to move on. The OKAY button also appears when the user had requested modification to an existing agreement and the request was denied. The agreement appear on the URGENTS form and then displayed on the REVIEW form so that the user is aware of the decline. The okay button simply allows the user to move on after reviewing the agreement at issue.

SEND Button (not shown)—The SEND button is visible and enabled only when the REVIEW Form is used in the REQUEST TO MODIFY AN EXISTING AGREEMENT mode. The user clicks on this button to transmit his request.

CANCEL Button (not shown)—The CANCEL button is visible and enabled only when the REVIEW Form is used in the REQUEST TO MODIFY AN EXISTING AGREEMENT mode. The user clicks on this button to cancel his request in progress and close the form.

ARCHIVE Button (not shown)—If a party declines a request or proposal, the originating party sees the declined request/proposal on his URGENTS view. When reviewing this item in the REVIEW form, the user can either redirect the request/proposal to another party, or simply archive the item. By pressing the ARCHIVE button, the user saves a record of the failed negotiations.

REDIRECT Button (not shown)—The REDIRECT button is enabled only after the user changes the SUPPLIER or CUSTOMER field to indicate his intentions to transmit the request/proposal to a new party. In the case of redirection, the original request or proposal is archived automatically and a new request/proposal transmitted.

The Deliverable List Form

Figure 12:
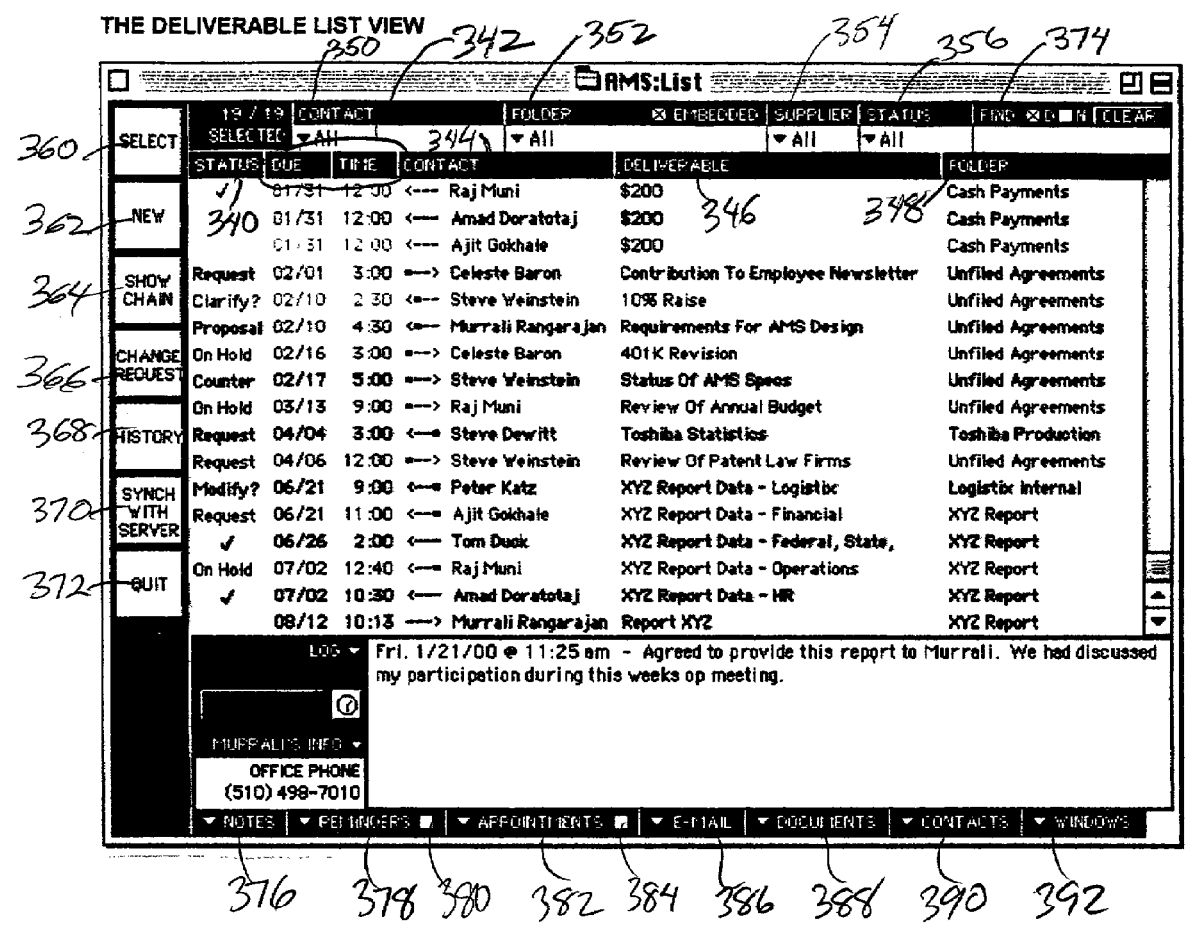

FIG. 12 shows a DELIVERABLE LIST View Form. The DELIVERABLE LIST View lists those agreements that have been made with suppliers and customers as well as those for which negotiations are in progress. Each user has access to view only those agreements for which he is either the supplier or customer. Upon startup of AMS, the user's server's AMS database is queried to select all of the user's agreements. The user can click on any agreement in this view to select that agreement. The NOTE and CONTACT INFO fields at the bottom of the form display information for the selected agreement. The 'SHOW CHAIN', 'CHANGE REQUEST' and 'HISTORY' buttons along the left side of the form act on the selected agreement. All the other controls are independent of the selected agreement. The displayed agreements can be sorted in any column by clicking on a column heading. Clicking a second time sorts down. The columns displayed are:

STATUS Column 340—Displays negotiation and completion status. For deliverables under negotiation, the STATUS column displays one of the following values: Requested, Proposed, On Hold, Countered, Clarify? (clarification requested), and Modify? (modification to an existing agreement requested). For agreements that have been reached but the Deliverable not yet completed, the STATUS column is empty.

The user can click on an empty STATUS COLUMN to create a completion check. AMS will update the agreement record to reflect this and transmit this information to the other party to the agreement. The second party then observes a gray check mark in the STATUS column, indicating the first party has considered the deliverable completed. A STATUS column containing both a red and a gray check mark indicates that both parties to the agreement consider it completed. Until the agreement is archived, a user may rescind a completion check by clicking a second time on the STATUS column. The red check disappears.

When a user marks an agreement as completed, a new state is recorded in the Agreement record and the time and date of completion is stored. If the user clears the completion check, the time of rescinding the completion is documented as well.

DUE DATE & TIME Column 342—These columns act as a single column. The sort is chronological with both time and date considered regardless of which column heading is clicked. The DUE DATE & TIME values are red if the due time has passed and the agreement has not been checked as completed.

CONTACT Column 344—This column contains the name of the other party to the agreement. In addition, an arrow has been placed in front of the contact name. If the arrow points to the contact (to the right), then the deliverable is due to the contact and the user is the supplier. If the arrow points away from the contact, then the deliverable is due to the user, who is the customer in this case. For those deliverables that are in negotiation, a small red square is overlaid on the supplier to customer arrow. The red square indicates who is next to act on the negotiation status. If the red square is on the contact's end of the arrow, on the right, then the contact is due to respond to the user's last negotiation position. The red square on the left implies the user is next to respond.

DELIVERABLE Column 346—This column contains the deliverable.

FOLDER Column 348—This column contains the folder into which the deliverable was placed.

In addition to sorting the displayed deliverables, the user has the ability to view any subset of his agreements. The following controls are provided for this purpose:

CONTACT 350, FOLDER 352, USER ROLE (currently SUPPLIER) 354 and STATUS 356 Pop-Up Menus—These four pop-up menus along the top of the form are used for selecting any subgroup of agreements. Selection criteria may be chosen based on contact name, folder, user role (customer, supplier, or both), status (open, completed, on hold by the user, on hold by the contact, user initiated requests or proposals still in negotiation, etc.), and/or range of due dates (today, this week, or any user selected range). When selecting a folder, the user may elect to view all agreements in both the selected folder and that folders embedded folders, or just the agreements stored within the selected folder. The selection criteria pop-up menus are interactive in that these menu choices are created in real time depending upon the currently indicated selections. For instance: if a contact is selected for which the user is the supplier in all the currently existing agreements, then the choice of user role automatically is set to supplier and the pop-up menu is disabled. Further, if there were only two folders that contained agreements with this contact, then only the folder paths to these two folders are displayed, because these contain the only relevant choices. If the Embedded check box is unchecked, then only the two folders that actually contain the agreements are enabled in the pop-up menu while all the other folders in the folder path are grayed out. Once the selection criteria are chosen, the user can select the qualifying agreements by using the SELECT button.

SELECT Button 360—The selection button is actually a pop-up menu that allows the user to select a subgroup of agreements for display on THE DELIVERABLE LIST form. The first choice on the menu is 'Current Settings'. Its selection results in the display of those agreements that meet the criteria set by the four pop-up menu settings as explained above. The other menu choices include: all deliverables, all open deliverables, all open deliverables for which the user is the supplier, all open deliverables for which the user is the customer, and any user-created speed settings. A final set of choices on the SELECT pop-up menu relates to the creation, renaming and deletion of speed settings. These are: "Save the current settings as . . . ", "Rename the current setting as . . . ", and "Delete a speed setting . . . ".

NEW Button 362—The new button is actually a pop-up menu that allows the user to select either "New Request" or "New Proposal". In either case, the NEW REQUEST/PROPOSAL form is displayed.

SHOW CHAIN Button 364—Above, when discussing the NEW REQUEST/PROPOSAL form, the concept of downstream customer was presented. By linking supplier agreements to existing customer commitments, the user is able to group all related agreements within any given supply chain. Each supply chain segment consists of one agreement with a customer and all the attached supplier agreements. The SHOW CHAIN button selects all the agreements that are in the same supply chain as the currently selected agreement and displays them on the SHOW CHAIN form, which is the next form to be discussed below.

SHOW CUSTOMERS Button—(This button is not shown on the form above.) This button is enabled only when an agreement with a supplier is selected. The SHOW CUSTOMERS form looks identical to the SHOW CHAIN form except for a reversal of the supplier and customer fields on that form. The SHOW CUSTOMERS button selects all the agreements that exist with customers who have in their supply chain the currently selected supplier and displays them on the SHOW CHAIN form in the SHOW CUSTOMERS mode.

CHANGE REQUEST Button 366—(This button is disabled if the selected agreement is in negotiation.) At times, the user may need to request a change in an existing agreement. By clicking on the change request button, the REVIEW form, in the REQUEST TO MODIFY AN EXISTING AGREEMENT mode, is brought forward. The most recent state of the agreement is presented in the Deliverable, Specifications, etc fields. The user may then make his proposed modifications in the appropriate fields and transmit the request.

During the initial round of negotiations, the DELIVERABLE LIST View, the SHOW CHAIN View, and the URGENTS View data reflects the most recent state of the negotiations. However, when a change request has been made, the terms of the preceding agreement remain displayed throughout the negotiation process as this agreement stands until both parties reach a new settlement. The STATUS Column value of MODIFY? Is the only indication of the re-negotiations in progress.

HISTORY Button 368—Clicking on the HISTORY button brings up the HISTORY Form. This form, to be discussed below, is quite similar to the REVIEW Form in that it allows the user to review the different states of the agreement as well as other components to the agreement history, such as transmitted documents and e-mail, at any time.

SYNCH WITH SERVER Button 370—This button allows the user to synchronize his client-side Agreement database with a server.

QUIT Button 372—Cause the system to exit the AMS and return to the operating system desktop.

The remaining controls are generic to many of the AMS forms.

FIND Text Box 374—Located in the top right corner of the DELIVERABLES LIST form, the FIND text box accepts user input and searches either the Deliverable field, the Log/Notes field(s) or both. The Deliverable Check Box and Notes Check Box, abbreviated (D and N) on the form above, are used for the selection of search fields. If the Notes fields are to be searched, then all note fields including the default LOG field and all user created contact or subject fields are checked. If the search phrase is found in a notes field that is different than the one displayed, then AMS will switch to the appropriate note field. The search string is highlighted within the field data. A FIND AGAIN Button is preferably included to permit for continued searching.

NOTES (NOTEBOOK) Pop-Up Menu 376—To avoid confusion, this pop-up menu is preferably renamed "NOTEBOOK". The NOTEBOOK is an organizational tool that allows the user to store and retrieve notes that are unrelated to any of his agreements. (It is expected that related notes are saved as a contact or subject note that is attached to an agreement.) Such notes may pertain to company policies, videos to rent, books to read and the like. The NOTEBOOK pop-up menu choices include Open Notebook, New Note, and Find Note . . . The Notebook is sub-divided into a user created hierarchy of folders and the notes are placed into folders. The Notebook is more fully described later on in this document.

REMINDERS (TO DO) Pop-Up Menu 378—To-Do items may, or may not, have a particular due date and time assigned to them. These are personal reminders that the user wishes to have reference to. Reminders may be set up for any given To-Do which create instant message type of pop-up dialog boxes to remind the user of an upcoming to-do. The pop-up message box have options to delete the to-do item, reset the reminder to a future date and time, open the related To-Do form, etc. The REMINDERS (TO-DO) pop-up menu selections include: Open The To-Do List, Create a New To-Do.

REMINDERS Check Box 380—Checking this box redraws the DELIVERABLE LIST View to include those reminders that have a due date and time. This allows incorporation of personal, time sensitive commitments to appear along side those commitments made to others. Unchecking this box redraws the DELIVERABLE LIST View to exclude personal reminders.

APPOINTMENTS Pop-Up Menu 382—Outlook provides for requesting meetings with others. The APPOINTMENTS pop-up menu allows the user to Request a New Meeting/Appointment, View Today's Schedule, View This Week's Schedule, View This Month's Schedule, etc.

APPOINTMENTS Check Box 384—Checking this box redraws the DELIVERABLE LIST View to include scheduled appointments and meetings. Unchecking this box redraws the DELIVERABLE LIST View to exclude scheduled appointments and meetings.

E-MAIL Pop-Up Menu 386—The purpose of the E-Mail pop-up menu is to facilitate e-mail maintenance from within the AMS environment. All e-mail that is sent by the user is automatically attached to the agreement that is selected at the time the e-mail form is opened. The AMS e-mail form differs from the typical e-mail form in that the AMS form has additional fields for Deliverable and Due Date & Time. Outgoing e-mail has hidden data that includes its associated agreement ID. Thus, AMS will automatically attach incoming e-mail to its associated agreement. The E-Mail pop-up menu selections include:

1) New E-Mail To [the name of the supplier or customer for the currently selected agreement]. If the Notes field is currently displaying contact notes, then this menu selection displays the contact name rather than the supplier or customer name.
2) New E-Mail To . . . A dialog box requests the user to type in the name of the recipient.
3) A listing of all previously sent or received e-mail that has been attached to the selected agreement. Previous e-mail is listed by date, 'To' or 'From', the recipient or sender's name, and subject.

DOCUMENTS Pop-Up Menu 388—The Document pop-up menu facilitates the origination, storage and retrieval of all agreement related documents. During the life of an agreement, the user may need to create documents, save documents that may have been sent to the user as attachments to e-mail, or attach relevant files collected from any source, such as the Web. When a user receives an e-mail that has an attached document, the document is preferably attached to the agreement automatically when the e-mail is saved. The Document pop-up menu selections include:
1) Open A New Word Document
2) Open A New Excel Spreadsheet
3) Open A New Access Database
4) Attach A File To This Agreement . . .
5) A listing of all attached documents INTERNET Pop-Up Menu—This pop-up menu is not displayed on the sample figure above. The Internet menu provides the user with easy access to the Internet from within AMS. Any bookmarks saved are added to the Internet Menu selections for whichever Agreement is currently selected.

CONTACTS Pop-Up Menu 390—The Contacts pop-up menu provides easy access to the Outlook contacts database without leaving AMS. The Contact menu selections include:
1) Display Info For [Name of Customer or Supplier for the currently selected agreement]
2) Display Info For . . . A dialog box opens for the user to enter the name of the contact of interest.
3) Enter a New Contact . . .
4) A list of contacts for whom a contact notes field has been created for the currently selected agreement.
5) A list of Directories (AMS Directories are similar to address books. They provide a quick method to get to frequently used phone numbers and other contact info.)

WINDOWS Pop-Up Menu—The Windows pop-up menu allows the user to navigate between open windows within AMS.

The Show Chain Form

FIG. 13 shows a Show Chain Form. The SHOW CHAIN Form is the principle view for working within AMS. Although the DELIVERABLE LIST View allows the user to view, sort and select his choice of agreements, it is the SHOW CHAIN Form that exposes all the agreement information and facilitates coordination of supplier activities with their corresponding customer commitment.

This form is separated into two distinct parts. On top, there are the familiar agreement areas: customer/supplier shared fields and user private data fields. All fields have the same functionality as explained earlier herein. The Customer, Supplier, Deliverable, Specifications, and Due Date/Time Fields are disabled. A plus sign (+) to the right of the field label indicates that there is more information in the field than what is showing on the form. Clicking on any field opens to a form (or page within this form) that displays only the field of interest with full accessibility, to all the data in that field. The CC List field above illustrates such a field.

In the top right hand corner, the Elements Of Customer Satisfaction 400 are displayed along with the most recent, if any, customer scoring of the supplier's performance. If the customer had entered any comments along with the numerical scores, then a plus sign is shown to the right of the score, as indicated above. Clicking on the Elements Of Satisfaction field 400 opens the ELEMENTS OF CUSTOMER SATISFACTION Form FIG. 14 (or page of this form) which displays the current customer evaluation in full and allows the user to review previous customer entries as well. Neither the supplier nor customer can edit any of the pre-existing data. However, the customer is able to change the elements, change the order of priority of the elements, and/or enter new scores for customer satisfaction from the ELEMENTS OF CUSTOMER SATISFACTION Form. This form is presented in more detail below.

The bottom part of the Show Chain Form lists all suppliers for the selected customer agreement. If a supplier agreement is selected on the DELIVERABLE LIST View when the SHOW CHAIN button is clicked, then the SHOW CHAIN Form lists the selected supplier agreement, the linked customer agreement, and all other supplier agreements that are linked to the customer agreement. The user may click on any of the agreements listed on the bottom of the form to load that agreement's data into the fields at the top of the form.

The buttons along the left side of the form, DONE, NEW, CHANGE REQUEST, HISTORY, SYNCH WITH SERVER, QUIT, have the same functionality as those described on the DELIVERABLE LIST View, Additionally, all of the pop-up menus illustrated on the DELIVERABLE LIST View are available on SHOW CHAIN Form as well. Note that the STATUS column is available for checking off completed deliverables.

The SHOW CHAIN Form may also be viewed in the SHOW CUSTOMERS mode. In this mode, the bottom half of the form lists one supplier agreement on top and customer agreements below. The customer agreements listed all have the selected supplier in their supply chain. While in this mode, if any customer agreement is clicked on, all of the data fields above display data for that agreement. In addition, the supplier agreement changes to the relevant supplier agreement for the currently selected customer agreement.

The Elements of Customer Satisfaction Form

FIG. 14 shows an ELEMENTS OF CUSTOMER SATISFACTION Form. The ELEMENTS OF CUSTOMER SATISFACTION Form is accessible only by the customer of any given agreement. It allows the customer to assign his preferred elements of satisfaction and their order of priority. These elements may be assigned and/or changed at the initiation of a request or at any other time during the life of the agreement. This form opens when the customer clicks on the ELEMENTS OF SATISFACTION field on the NEW REQUEST, REVIEW, or SHOW CHAIN forms.

AMS comes preloaded with a selection of ELEMENTS that may be modified prior to installation by corporate clients via AMS preference settings. For each Element of Satisfaction, there is an Element Description that provides a clear explanation of the element. In addition, each user may add elements and their corresponding descriptions at any time. To facilitate element selection, the user may create templates that store unique sets Elements of Satisfaction groupings. One of these templates may be designated as the default set. The default set is automatically assigned to each new request upon initiation of the request. In addition, the default set is assigned to each new proposal when the REVIEW Form first opens the incoming proposal.

The fields and controls of the ELEMENTS OF CUSTOMER SATISFACTION Form are described below.

SUPPLIER Field 420—The supplier of the currently selected agreement.

DELIVERABLE Field 422—The deliverable of the currently selected agreement.

CURRENTLY SELECTED ELEMENTS Field 424—A list of the Elements of Customer Satisfaction that have been selected for the displayed deliverable. This is a list box that allows the user to drag any of the listed elements to a new position on the list to rearrange their order of priority. Additionally, any element may be double clicked or dragged off the list and onto the LIST OF ELEMENTS field to delete it from the list. If an element is selected (highlighted) on this list, then the element and its description is displayed in their corresponding fields below the list.

LIST OF ALL ELEMENTS Field 426—A list of all of the Elements of Customer Satisfaction that have been provided with AMS or created by the user. This is a list box that allows the user to drag any of the listed elements to the CURRENTLY SELECTED ELEMENTS field. Double clicking on an element moves it to the CURRENTLY SELECTED ELEMENTS field as well. If an element is selected (highlighted) on this list, then the element and its description are displayed in their corresponding fields below the list. Note that an element may only appear in one of the two list boxes at a time.

SELECTED TEMPLATE Field 428—This field displays the name of any template that may be selected from the TEMPLATES pop-up menu. A template name may also be displayed if the user individually drags a template's elements to the CURRENTLY SELECTED ELEMENTS field and lists them in the same order as the template list. Note that both elements and element order must match for the template to be identified.

SELECTED ELEMENT Field 430—This field displays the name of the currently selected ELEMENT OF CUSTOMER SATISFACTION. It is enabled thereby allowing the user to rename his elements at any time.

SELECTED ELEMENT DESCRIPTION Field 432—This field displays the description of the currently selected ELEMENT OF CUSTOMER SATISFACTION. It is enabled thereby allowing the user to redefine the chosen element.

TEMPLATES Pop-Up Menu 434—This pop-up menu provides for selection of user-created lists of ELEMENTS OF CUSTOMER SATISFACTION. When a template name is chosen, the elements are displayed in the CURRENTLY SELECTED ELEMENTS FIELD. The first element in the list is highlighted and the element and its description are displayed in the corresponding fields below the list. The pop-up menu selections also include 'Save the Current Selection as A New Template . . . ' and 'Delete the Currently Selected Template'. These menu selections toggle depending upon whether or not the current list of selected elements match a previously assigned template. Users may assign different template names for the same selection of elements but in different order of priority.

CLEAR ALL Button 436—Clears the CURRENTLY SELECTED ELEMENTS field.

ADD A NEW ELEMENT Button 438—Clears the SELECTED ELEMENT and SELECTED ELEMENT DESCRIPTION fields. The SELECTED ELEMENT field gets the focus. The user can now enter a new element and its description.

DELETE SELECTED ELEMENT Button 440—Used to delete the selected element in the LIST OF ALL ELEMENTS field. This button is disabled if no element is selected in this list box. (Occurs following the user's dragging an element from this list box to the CURRENTLY SELECTED ELEMENTS list box.

DONE Button 442—Closes the form. If the selected elements list is different than the element list that existed when the form was opened, then a new Elements of Satisfaction state is stored in the ELEMENTS field of the agreement database.

The Elements of Customer Satisfaction Score Form

Figure 15:
FIG. 15 shows an Elements of Customer Satisfaction Score Form.

FIG. 15 shows an ELEMENTS OF CUSTOMER SATISFACTION SCORE Form. The ELEMENTS OF CUSTOMER SATISFACTION SCORE Form is used to both score the current set of Elements of Customer Satisfaction as well as review the history of customer satisfaction. Only the customer may score the elements. Both customer and supplier have access to the history. The scoring or modification of the Elements Of Customer Satisfaction become part of the history of the agreement.

FIG. 16 shows a Folder Selection Form.

FIG. 17 shows a Recipient List Selector Form.

FIG. 18 shows an E-mail Form.

Figure 19:
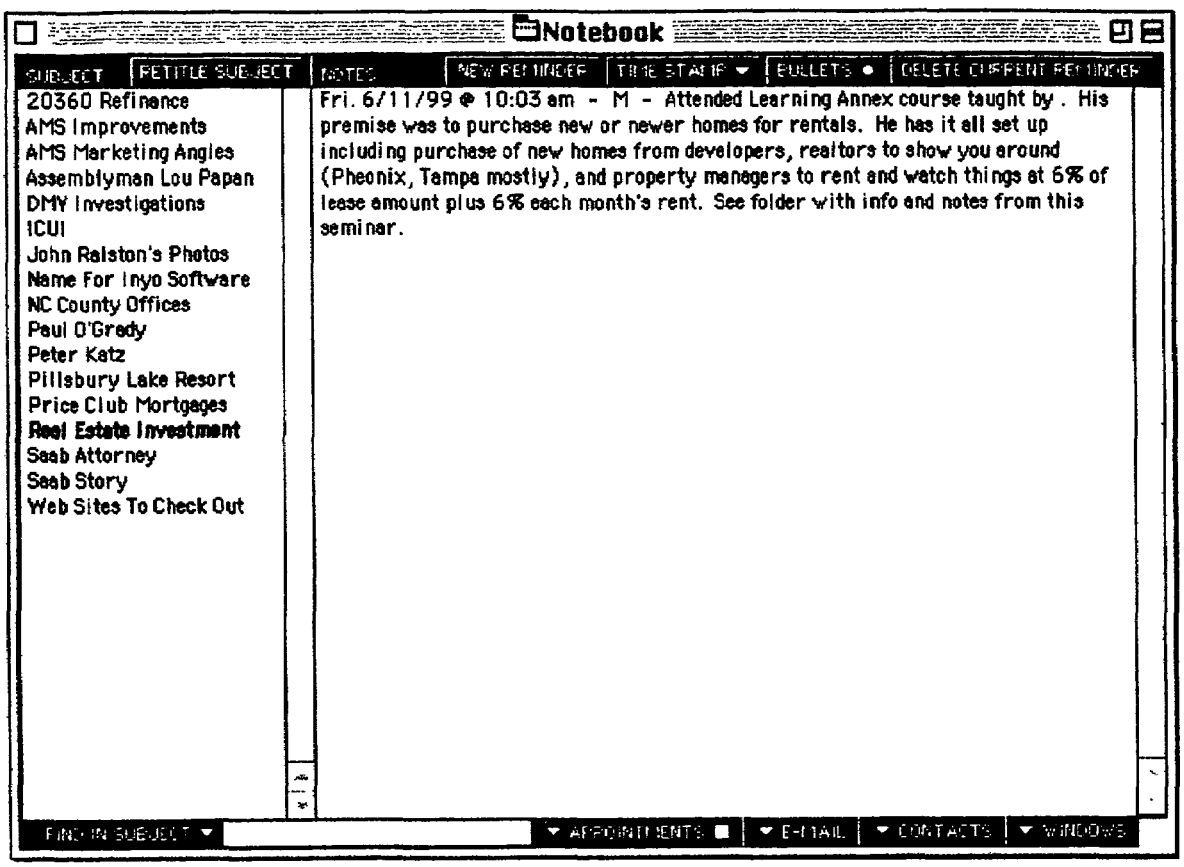
FIG. 19 shows a Notebook Form.

FIG. 19 shows a Notebook Form.

Although the present invention has been described in considerable detail with reference to certain preferred versions thereof, other versions are possible. For example, instead of an agreement between a pair of parties, a project among a plurality of parties can serve as an organizing device. The project is given a project ID and information relating to the specifications, deliverables and scope of the project is organized around the project ID.

Therefore, the spirit and scope of the appended claims should not be limited to the description of the preferred versions contained herein.

What is claimed is:

1. A computer implemented method of organizing information around agreements, comprising:

formulating a request by a first party using a first client computer system for an agreement with a second party using a second client computer system, the request containing an agreement ID that uniquely identifies the request and any agreement formed therefrom;

sending the request over a computer network to the second party;

receiving correspondence at the first party over the computer network from the second party regarding the request or any agreement formed therefrom, wherein said correspondence comprises information relating to a counter offer, a request for clarification, an acceptance of the request, a rejection of the request or a notification that the correspondence from the second party will be delayed; and saving the correspondence from the second party according to the unique agreement ID.

2. The computer implemented method of organizing information around agreements as recited in claim 1, wherein the first client computer system of the first party has an independent agreement database;

further including the step of storing the request in the agreement database in a record that includes or is linked to the agreement ID, after formulating the request; and wherein the step of saving the correspondence from the second party includes storing the second party correspondence in the agreement database of the first party in a record that includes or is linked to the agreement ID.

3. The computer implemented method of organizing information around agreements as recited in claim 1, wherein the correspondence from the second party is encapsulated in an electronic mail message that contains the agreement ID.

4. The computer implemented method of organizing information around agreements as recited in claim 1,
   wherein the correspondence from the second party includes a main body of information and an attachment to the main body; and
   wherein the attachment is according to the agreement ID.

5. The computer implemented method of organizing information around agreements as recited in claim 1, wherein the correspondence from the second party includes information unrelated to the formation or modification of the agreement, yet still related to the agreement.

6. The computer implemented method of organizing information around agreements as recited in claim 5, wherein the correspondence from the second party is taken from the group consisting of: a facsimile transmission, an electronic mail message, a letter sent by post, or an HTML document.

7. The computer implemented method of organizing information around agreements as recited in claim 5,
   wherein the correspondence from the second party includes a main body of information and an attachment to the main body; and
   wherein the attachment is saved according to the agreement ID.

8. The computer implemented method of organizing information around agreements as recited in claim 5, wherein the correspondence from the second party is encapsulated in an electronic mail message that contains the agreement ID.

9. The computer implemented method of organizing information around agreements as recited in claim 1, further including the steps of:
   sending correspondence from the first client computer system of the first party to the second client computer system of the second party relating to the request or any agreement derived therefrom; and
   saving the correspondence from the first party relating to the request according to the unique agreement ID given the request.

10. The computer implemented method of organizing information around agreements as recited in claim 9,
    wherein the first client computer system of the first party has an independent agreement database; and
    wherein the step of saving the correspondence from the first party relating to the request includes storing the first party correspondence in the agreement database of the first party in a record that includes or is linked to the agreement ID.

11. The computer implemented method of organizing information around agreements as recited in claim 9, wherein the correspondence from the first party is responsive to correspondence from the second party and includes a counter offer, a request for clarification, an acceptance or a rejection of a counter offer from the second party or a notification that the correspondence from the first party will be delayed.

12. The computer implemented method of organizing information around agreements as recited in claim 11, wherein the correspondence from the first party is encapsulated in an electronic mail message that contains the agreement ID.

13. The computer implemented method of organizing information around agreements as recited in claim 11,
    wherein the correspondence from the first party includes a main body of information and an attachment to the main body; and
    wherein the attachment is saved according to the agreement ID.

14. The computer implemented method of organizing information around agreements as recited in claim 9, wherein the correspondence from the first party includes information unrelated to the formation or modification of the agreement, yet still related to the agreement.

15. The computer implemented method of organizing information around agreements as recited in claim 14, wherein the correspondence from the first party is taken from the group consisting of a facsimile transmission, an electronic mail message, a letter sent by post, or an HTML document.

16. The computer implemented method of organizing information around agreements as recited in claim 14,
    wherein the correspondence from the first party includes a main body of information and an attachment to the main body; and
    wherein the attachment is saved according to the agreement ID.

17. The computer implemented method of organizing information around agreements as recited in claim 14, wherein the correspondence from the first party is encapsulated in an electronic mail message that includes the agreement ID.

18. The computer implemented method of organizing information around agreements as recited in claim 9,
    wherein the second client computer system of the second party has an independent agreement database; and
    further comprising the step of storing the request sent to the second party in the database of the second party in a record that includes or is linked to the agreement ID.

19. The computer implemented method of organizing information around agreements as recited in claim 9,
    wherein the second client computer system of the second party has an independent agreement database; and
    further comprising the step of storing the correspondence sent from the first party to the second party in the database of the second party in a record that includes or is linked to the agreement ID.

20. The computer implemented method of organizing information around agreements as recited in claim 1, further comprising the steps of:
    receiving correspondence by the first party from a third party using a third client computer system who is not a party to the agreement between the first and second party;
    determining an agreement ID of the first party to which the third party correspondence is related; and
    storing the correspondence according to the determined agreement ID.

21. The computer implemented method of organizing information around agreements as recited in claim 20, wherein the correspondence from the third party is taken from a group consisting of: a facsimile transmission, an electronic email message, a letter sent by post or an HTML document.

22. The computer implemented method of organizing information around agreements as recited in claim 20,
   wherein the correspondence from the third party includes a main body of information and an attachment to the main body; and
   wherein the attachment is saved according to the determined agreement ID.

23. The computer implemented method of organizing information around agreements as recited in claim 1,
   wherein a server computer system is configured to manage an agreement database that is accessible by the computer systems of the first and second parties;
   further comprising the step of storing the request in the server's agreement database in a record that includes or is linked to the agreement ID, after formulating the request; and
   wherein the step of saving the correspondence from the second party includes storing the second party correspondence in the server's agreement database in a record that includes or is linked to the agreement ID.

24. The computer implemented method of organizing information around agreements as recited in claim 23, wherein the correspondence from the second party includes information relating to a counter offer, a request for clarification, an acceptance or a rejection of the request or a notification that the correspondence from the second party will be delayed.

25. The computer implemented method of organizing information around agreements as recited in claim 24,
   wherein the correspondence from the second party includes a main body of information and an attachment to the main body; and
   wherein the attachment is saved according to the agreement ID.

26. The computer implemented method of organizing information around agreements as recited in claim 23, wherein the correspondence from the second party includes information unrelated to the formation or modification of the agreement, yet still related to the agreement.

27. The computer implemented method of organizing information around agreements as recited in claim 26, wherein the correspondence from the second party is taken from the group consisting of: a facsimile transmission, an electronic mail message, a letter sent by post or an HTML document.

28. The computer implemented method of organizing information around agreements as recited in claim 26, wherein the correspondence from the second party includes a main body of information and an attachment to the main body; and
   wherein the attachment is saved according to the agreement ID.

29. The computer implemented method of organizing information around agreements as recited in claim 23, further including the steps of:
   sending correspondence from the first client computer system of the first party to the second client computer system of the second party relating to the request; and
   saving the correspondence from the first party relating to the request in the server's agreement database in a record that includes or is linked to the agreement ID.

30. The computer implemented method of organizing information around agreements as recited in claim 29, wherein the correspondence from the first party is responsive to correspondence from the second party and includes a counter offer, a request for clarification, an acceptance or a rejection of a counter offer from the second party or a notification that the correspondence from the first party will be delayed.

31. The computer implemented method of organizing information around agreements as recited in claim 30,
   wherein the correspondence from the first party includes a main body of information and an attachment to the main body; and
   wherein the attachment is saved according to the agreement ID.

32. The computer implemented method of organizing information around agreements as recited in claim 29, wherein the correspondence from the first party includes information unrelated to the formation or modification of the agreement, yet still related to the agreement.

33. The computer implemented method of organizing information around agreements as recited in claim 32, wherein the correspondence from the first party is taken from the group consisting of: a facsimile transmission, an electronic mail message, a letter sent by post, or an HTML document.

34. The computer implemented method of organizing information around agreements as recited in claim 32,
   wherein the correspondence from the first party includes a main body of information and an attachment to the main body; and
   wherein the attachment is saved according to the agreement ID.

35. A computer implemented method of managing agreements to form a supply chain, comprising:
   formulating and sending over a computer network a first request by a first party using a first client computer system and receiving a first acceptance over the computer network from a second party using a second client computer system to form a first agreement between the first party and the second party, the first agreement having a unique first agreement ID and specifying a first deliverable to be received by the first party;
   formulating and sending over the computer network a second request by the second party using a second client computer system and receiving a second acceptance over the computer network from a third party using a third client computer system to form a second agreement between the third party and the second party, the second request including a field for identifying a downstream agreement and specifying a second deliverable and a date for the second deliverable; and
   linking the second agreement to the first agreement by including the first agreement ID in the field identifying a downstream agreement to form a supply chain among the first, second and third parties.

36. The computer implemented method of managing agreements to form a supply chain as recited in claim 35, wherein the step of linking includes:
   specifying the first deliverable in the second request based on the deliverables of a list of customers, each having a deliverable due from the second party; and
   obtaining the first agreement ID based on the deliverable specified.

37. The computer implemented method of managing agreements to form a supply chain as recited in claim 36, wherein the linking includes:
   specifying the first deliverable in the second request based on the deliverables of a list of customers, each having a deliverable due from the second party with a due date and time subsequent to the date and time of the second deliverable; and obtaining the first agreement ID based on the deliverable specified.

38. The computer implemented method of managing agreements to form a supply chain as recited in claim 35, wherein the step of formulating the second request includes specifying a customer and a second deliverable; and wherein the step of linking includes:

specifying the first deliverable in the second request based on the deliverables of the specified customer; and obtaining the first agreement ID based on the deliverable specified.

39. The computer implemented method of managing agreements to form a supply chain as recited in claim 35, wherein the step of formulating the second request includes specifying a customer, a second deliverable and a date and time for the second deliverable; and wherein the step of linking includes:

specifying the first deliverable in the second request based on the deliverables of the specified customer with a due date and time subsequent to the second deliverable; and obtaining the first agreement ID based on the deliverable specified.

40. The computer implemented method of managing agreements to form a supply chain as recited in claim 35, wherein the step of formulating the second request includes specifying a folder and a second deliverable; and wherein the step of linking includes:

specifying the first deliverable in the second request based on the deliverables of a list of customers included in the specified folder; and obtaining the first agreement ID based on the deliverable specified.

41. The computer implemented method of managing agreements to form a supply chain as recited in claim 35, wherein the step of formulating the second request includes specifying a folder, a second deliverable and a date and time for the second deliverable; and wherein the step of linking includes:

specifying the first deliverable in the second request based on the deliverables of a list of customers included in the specified folder with a due date and time subsequent to the second deliverable; and obtaining the first agreement ID based on the deliverable specified.

* * * * *